United States Patent
Schofield et al.

(10) Patent No.: US 6,222,447 B1
(45) Date of Patent: *Apr. 24, 2001

(54) REARVIEW VISION SYSTEM WITH INDICIA OF BACKUP TRAVEL

(75) Inventors: Kenneth Schofield, Holland; Mark L. Larson, Grand Haven; Keith J. Vadas, Coopersville, all of MI (US)

(73) Assignee: Donnelly Corporation, Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/313,139

(22) Filed: May 17, 1999

Related U.S. Application Data

(63) Continuation of application No. 08/935,336, filed on Sep. 22, 1997, which is a continuation of application No. 08/445,527, filed on May 22, 1995, now Pat. No. 5,670,935, which is a continuation-in-part of application No. 08/023,918, filed on Feb. 26, 1993, now Pat. No. 5,550,677.

(51) Int. Cl.[7] .................................................. B60Q 1/00
(52) U.S. Cl. .......................... 340/461; 340/435; 340/436; 340/901; 340/903; 348/148; 345/7; 345/9; 701/300; 701/301
(58) Field of Search .................................. 340/461, 435, 340/436, 438, 901, 903; 348/118, 148; 345/7, 9; 701/300, 301, 302

(56) References Cited

U.S. PATENT DOCUMENTS

| | | | |
|---|---|---|---|
| 4,817,948 | * | 4/1989 | Simonelli ............................ 273/86 B |
| 5,414,461 | * | 5/1995 | Kishi et al. .......................... 348/115 |
| 5,424,952 | * | 6/1995 | Asayama .............................. 364/443 |
| 5,550,677 | * | 8/1996 | Schofield et al. ..................... 359/604 |
| 5,574,443 | * | 11/1996 | Hsieh .................................. 340/901 |
| 5,634,709 | * | 6/1997 | Iwama ................................. 362/83.1 |
| 5,670,935 | * | 9/1997 | Schofield et al. ..................... 340/461 |
| 5,793,420 | * | 8/1998 | Schmidt ............................... 348/148 |
| 5,798,575 | * | 8/1998 | O'Farrell et al. ..................... 307/10.1 |
| 5,949,331 | * | 9/1999 | Schofield et al. ..................... 340/461 |
| 5,959,555 | * | 9/1999 | Furuta .................................. 340/937 |

* cited by examiner

Primary Examiner—Julie Lieu
(74) Attorney, Agent, or Firm—Van Dyke, Gardner, Linn & Burkhart, LLP

(57) ABSTRACT

A rearview vision system for a vehicle includes an image capture device mounted at the rear of the vehicle and having a field of view directed rearwardly of the vehicle. A display system is viewable by a driver of the vehicle. The display system displays a rearward image output of the image capture device. A graphic overlay is superimposed on the rearward image when the gear actuator of the vehicle selects a reverse gear. The graphic overlay may include indicia of the anticipated path of travel of the vehicle. The graphic overlay may be disabled when the gear actuator of the vehicle is not in reverse gear.

101 Claims, 7 Drawing Sheets

FIG. 11

| 92 N1 | 94 N2 |
|---|---|
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| 11 | 11 |
| 12 | 13 |
| 13 | 14 |
| 14 | 15 |
| 15 | 16 |
| 16 | 17 |
| 17 | 18 |
| 18 | 19 |
| 19 | 20 |
| 20 | 22 |
| 21 | 23 |
| 22 | 24 |
| 23 | 25 |
| 24 | 26 |
| 25 | 28 |
| 26 | 29 |
| 27 | 30 |
| 28 | 31 |
| 29 | 33 |
| 30 | 34 |
| 31 | 35 |
| 32 | 36 |
| 33 | 38 |
| 34 | 39 |
| 35 | 40 |
| 36 | 42 |
| 37 | 43 |
| 38 | 44 |
| 39 | 46 |
| 40 | 47 |
| 41 | 49 |
| 42 | 50 |
| 43 | 51 |
| 44 | 53 |

| 92 N1 | 94 N2 |
|---|---|
| 45 | 54 |
| 46 | 56 |
| 47 | 57 |
| 48 | 59 |
| 49 | 60 |
| 50 | 62 |
| 51 | 63 |
| 52 | 65 |
| 53 | 66 |
| 54 | 68 |
| 55 | 70 |
| 56 | 71 |
| 57 | 73 |
| 58 | 74 |
| 59 | 76 |
| 60 | 78 |
| 61 | 79 |
| 62 | 81 |
| 63 | 83 |
| 64 | 85 |
| 65 | 86 |
| 66 | 88 |
| 67 | 90 |
| 68 | 92 |
| 69 | 94 |
| 70 | 95 |
| 71 | 97 |
| 72 | 99 |
| 73 | 101 |
| 74 | 103 |
| 75 | 105 |
| 76 | 107 |
| 77 | 109 |
| 78 | 111 |
| 79 | 113 |
| 80 | 115 |
| 81 | 117 |
| 82 | 119 |
| 83 | 121 |
| 84 | 124 |
| 85 | 126 |
| 86 | 128 |
| 87 | 130 |
| 88 | 132 |
| 89 | 135 |
| 90 | 137 |
| 91 | 139 |
| 92 | 142 |
| 93 | 144 |

| 92 N1 | 94 N2 |
|---|---|
| 94 | 146 |
| 95 | 149 |
| 96 | 151 |
| 97 | 154 |
| 98 | 156 |
| 99 | 159 |
| 100 | 162 |
| 101 | 164 |
| 102 | 167 |
| 103 | 170 |
| 104 | 172 |
| 105 | 175 |
| 106 | |
| 107 | |
| 108 | |
| 109 | |
| 110 | |
| 111 | |
| 112 | |
| 113 | |
| 114 | |
| 115 | |
| 116 | |
| 117 | |
| 118 | |
| 119 | |
| 120 | |
| 121 | |
| 122 | |
| 123 | |
| 124 | |
| 125 | |
| 126 | |
| 127 | |
| 128 | |
| 129 | |
| 130 | |
| 131 | |
| 132 | |
| 133 | |
| 134 | |
| 135 | |
| 136 | |
| 137 | |
| 138 | |
| 139 | |
| 140 | |
| 141 | |
| 142 | |

| 92 N1 | 94 N2 |
|---|---|
| 143 | |
| 144 | |
| 145 | |
| 146 | |
| 147 | |
| 148 | |
| 149 | |
| 150 | |
| 151 | |
| 152 | |
| 153 | |
| 154 | |
| 155 | |
| 156 | |
| 157 | |
| 158 | |
| 159 | |
| 160 | |
| 161 | |
| 162 | |
| 163 | |
| 164 | |
| 165 | |
| 166 | |
| 167 | |
| 168 | |
| 169 | |
| 170 | |
| 171 | |
| 172 | |
| 173 | |
| 174 | |
| 175 | |

REARVIEW VISION SYSTEM WITH INDICIA OF BACKUP TRAVEL

CROSS-REFERENCE TO RELATED APPLICATION

This application is a continuation of application Ser. No. 08/935,336, filed on Sep. 22, 1997, which is a continuation of application Ser. No. 08/445,527, filed on May 22, 1995, now U.S. Pat. No. 5,670,935, which is a continuation-in-part of patent application Ser. No. 08/023,918 filed Feb. 26, 1993, by Kenneth Schofield and Mark Larson now U.S. Pat. No. 5,550,677.

BACKGROUND OF THE INVENTION

This invention relates generally to vision systems for vehicles and, more particularly, to rearview vision systems which provide the vehicle operator with scenic information in the direction rearward of the vehicle. More particularly, the invention relates to a rearview vision system utilizing image capture devices, such as CMOS imaging arrays and the like.

A long-felt need in the art of vehicle rearview vision systems has been to eliminate exterior rearview mirrors by utilizing image capture devices, such as cameras, in combination with dashboard displays. This would be beneficial because it would reduce wind drag on the vehicle, wind noise and vehicle weight. Furthermore, rearview mirrors protrude a substantial distance from the side of the vehicle, which makes maneuvering in tight spaces more difficult. Image capture devices are capable of positioning in a greater variety of locations on the vehicle, providing more flexibility of vehicle styling. It is further expected that camera systems would greatly reduce the blind spots to the sides and rear of the vehicle common with vehicles equipped with conventional rearview mirror systems. The driver cannot perceive vehicles, objects, or other road users in such blind spots without turning his or her body, which interferes with forward-looking visual activities.

Camera-based rearview vision systems for vehicles have not obtained commercial acceptance. One difficulty with proposed systems has been that they present a large amount of visual information in a manner which is difficult to comprehend. This difficulty arises from many factors. In order to significantly reduce blind spots, multiple image capture devices are typically positioned at various locations on the vehicle. The image of an object behind the equipped vehicle is usually captured by more than one image capture device at a time and displayed in multiple images. This may confuse the driver as to whether more than one object is present. When multiple image capture devices are positioned at different longitudinal locations on the vehicle, objects behind the vehicle are at different distances from the image capture devices. This results in different image sizes for the same object. This effect is especially noticeable for laterally extending images, such as a bridge, highway crosswalk markings, the earth's horizon, and the like. Such images are at different vertical angles with respect to the image capture devices. This results in different vertical positions on the display causing the elongated image to appear disjointed.

A camera system provides a monocular view of the scene, compared to the binocular, or stereoscopic, view obtained when the scene is viewed through a rearview mirror. This makes the ability to judge distances in a camera system a problem. This effect is most noticeable at distances close to the vehicle where stereoscopic imaging is relied upon extensively by the driver in judging relative locations of objects. Therefore, known camera systems fail to provide to the driver important information where that information is most needed—at small separation distances from surrounding objects.

Another difficulty with camera systems is that, in order to provide a sufficient amount of information, the camera system typically presents the driver with a greatly increased field of view. This improves performance by further reducing blind spots at the side and rear of the vehicle. However, an increased field of view is often obtained by utilizing a wide-angle lens which introduces distortion of the scene and further impairs the ability of the driver to judge distances of objects displayed. The problem with such distortion of the scene is that the driver must concentrate more on the display and take a longer time to interpret and extract the necessary information. This further distracts the driver from the primary visual task of maintaining awareness of vehicles and other objects in the vicinity of the driven vehicle.

SUMMARY OF THE INVENTION

The present invention is directed towards enhancing the interpretation of visual information in a rearview vision system by presenting information in a manner which does not require significant concentration of the driver or present distractions to the driver. This is accomplished according to the invention in a rearview vision system having at least two image capture devices positioned on the vehicle and directed rearwardly with respect to the direction of travel of the vehicle. A display is provided for images captured by the image capture devices. The display combines the captured images into an image that would be achieved by a single rearward-looking camera having a view unobstructed by the vehicle. In order to obtain all of the necessary information of activity, not only behind but also along side of the vehicle, the virtual camera should be positioned forward of the driver. The image synthesized from the multiple image capture devices may have a dead space which corresponds with the area occupied by the vehicle. This dead space is useable by the driver's sense of perspective in judging the location of vehicles behind and along side of the equipped vehicle.

The present invention provides techniques for synthesizing images captured by individual, spatially separated, image capture devices into such ideal image, displayed on the display device. This may be accomplished according to an aspect of the invention by providing at least three image capture devices. At least two of the image capture devices are side image capture devices mounted on opposite sides of the vehicle. At least one of the image capture devices is a center image capture device mounted laterally between the side image capture devices. A display system displays an image synthesized from outputs of the image capture devices. The displayed image includes an image portion from each of the image capture devices. The image portion from the center image capture device is vertically compressed.

It has been discovered that such vertical compression substantially eliminates distortion resulting from the spatial separation between the cameras and can be readily accomplished. In an illustrated embodiment, the image compression is carried out by removing selective ones of the scan lines making up the image portion. A greater number of lines are removed further away from the vertical center of the image.

The compression of the central image portion produces a dead space in the displayed image which may be made to correspond with the area that would be occupied by the vehicle in the view from the single virtual camera. Preferably, perspective lines are included at lateral edges of the dead space which are aligned with the direction of travel of the vehicle and, therefore, appear in parallel with lane markings. This provides visual clues to the driver's sense of perspective in order to assist in judging distances of objects around the vehicle.

According to another aspect of the invention, image enhancement means are provided for enhancing the displayed image. Such means may be in the form of graphic overlays superimposed on the displayed image. Such graphic overlap may include indicia of the anticipated path of travel of the vehicle which is useful in assisting the driver in guiding the vehicle in reverse directions. Such graphic overlay may include a distance grid indicating distances behind the vehicle of objects juxtaposed with the grid.

These and other objects, advantages, and features of this invention will become apparent by review of the following specification in conjunction with the drawings.

BRIEF DESCRIPTION OF THE DRAWINGS

FIG. 11 is a chart illustrating the horizontal row of pixels (n1, n2) on which an object will be imaged from two longitudinally separated image capture devices as that object is spaced at different longitudinal distances from the image capture devices.

DESCRIPTION OF THE PREFERRED EMBODIMENT

Figure 1:
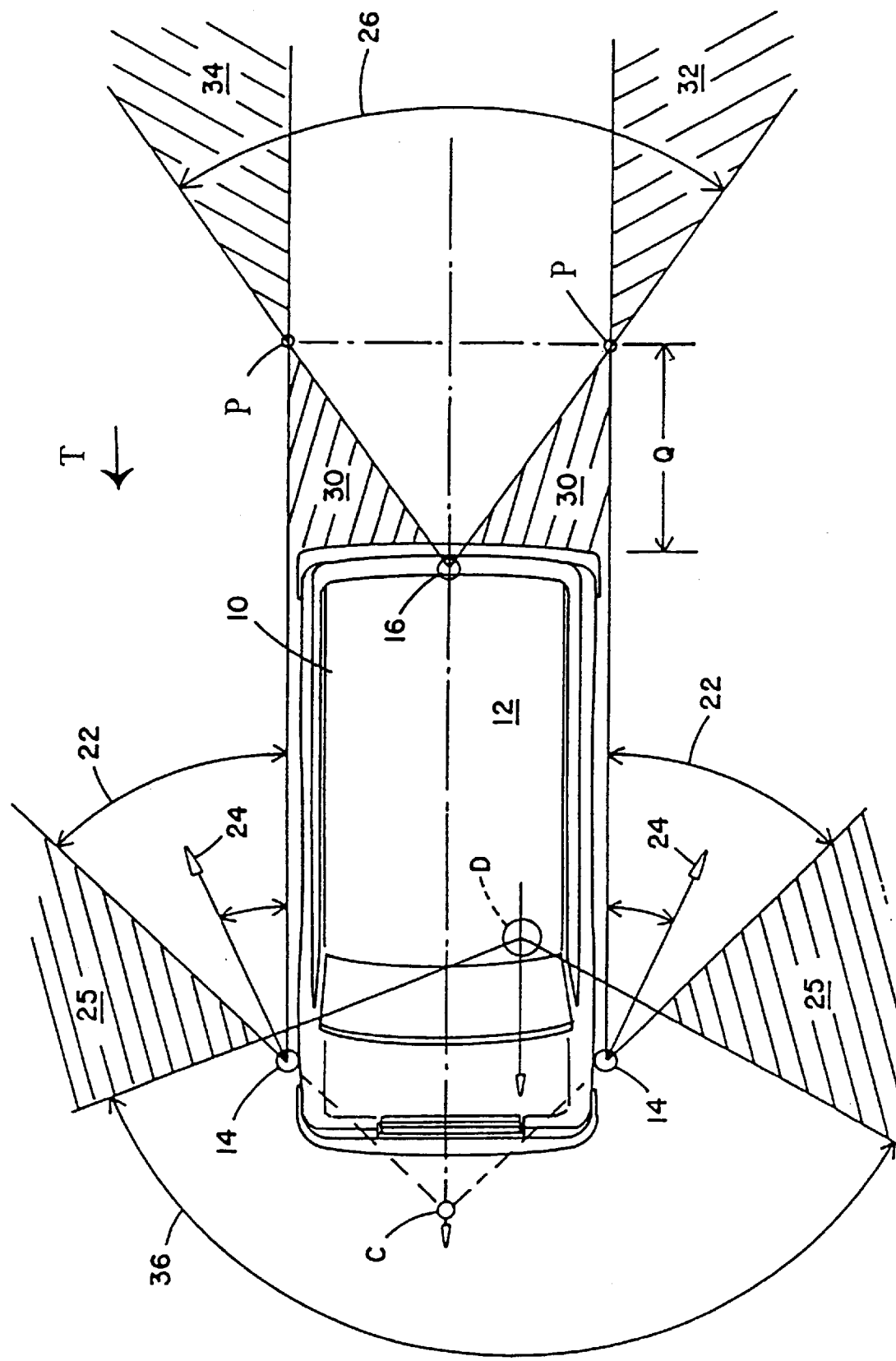
FIG. 1 is a top plan view of a vehicle having a rearview vision system according to the invention.

Referring now specifically to the drawings, and the illustrative embodiments depicted therein, a vehicle 10, which may be an automobile, a light truck, a sport utility vehicle, a van, a bus, a large truck, or the like includes a rearview vision system, generally illustrated at 12, for providing a driver of the vehicle with a view rearwardly of the vehicle with respect to the direction of travel D of the vehicle (FIG. 1). Vision system 12 includes at least two side image capture devices 14 positioned, respectively, on opposite sides of vehicle 10 and a center image capture device 16 positioned on the lateral centerline of the vehicle. All of the image capture devices are directed generally rearwardly of the vehicle. Rearview vision system 12 additionally includes an image processor 18 for receiving data signals from image capture devices 14, 16 and synthesizing, from the data signals, a composite image 42 which is displayed on a display 20.

As will be set forth in more detail below, the images captured by image capture devices 14, 16 are juxtaposed on display 20 by image processor 18 in a manner which approximates the view from a single virtual image capture device positioned forwardly of the vehicle at a location C and facing rearwardly of the vehicle, with the vehicle being transparent to the view of the virtual image capture device. Vision system 12 provides a substantially seamless panoramic view rearwardly of the vehicle without duplicate or redundant images of objects. Furthermore, elongated, laterally-extending, objects, such as the earth's horizon, appear uniform and straight across the entire displayed image. The displayed image provides a sense of perspective, which enhances the ability of the driver to judge location and speed of adjacent trailing vehicles.

Each of side image capture devices 14 has a field of view 22 and is aimed rearwardly with respect to the vehicle about an axis 24 which is at an angle, with respect to the vehicle, that is half of the horizontal field of view of the image capture device. In this manner, each of the image capture devices 14 covers an area bounded by the side of the vehicle and extending outwardly at an angle defined by the horizontal field of view of the respective side image capture device. Center image capture device 16 has a horizontal field of view 26, which is symmetrical about the longitudinal axis of the vehicle. The field of view of each side image capture device 14 intersect the field of view of center image capture device 16 at a point P which is located a distance Q behind vehicle 10.

Figure 2:
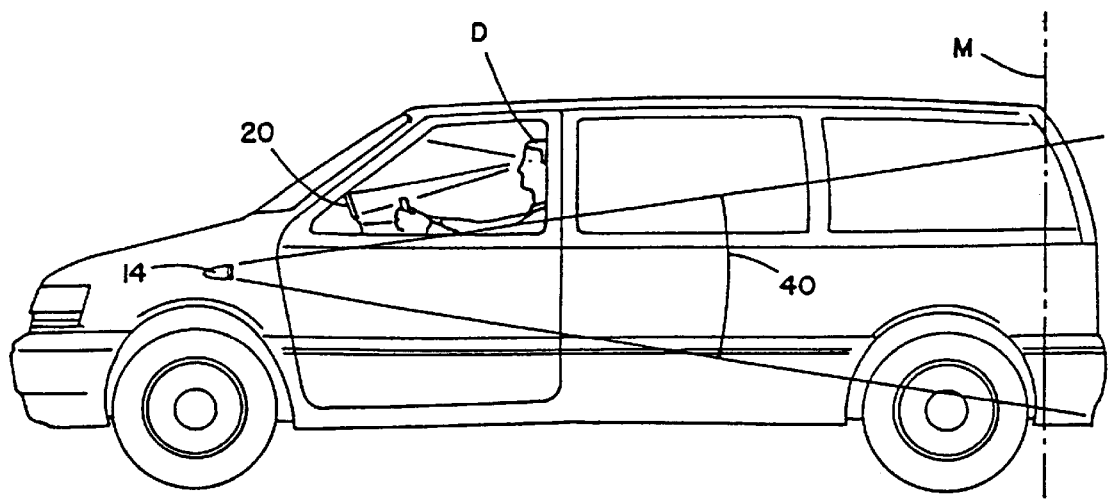
FIG. 2 is a side elevation of the vehicle in FIG. 1.
Figure 4:
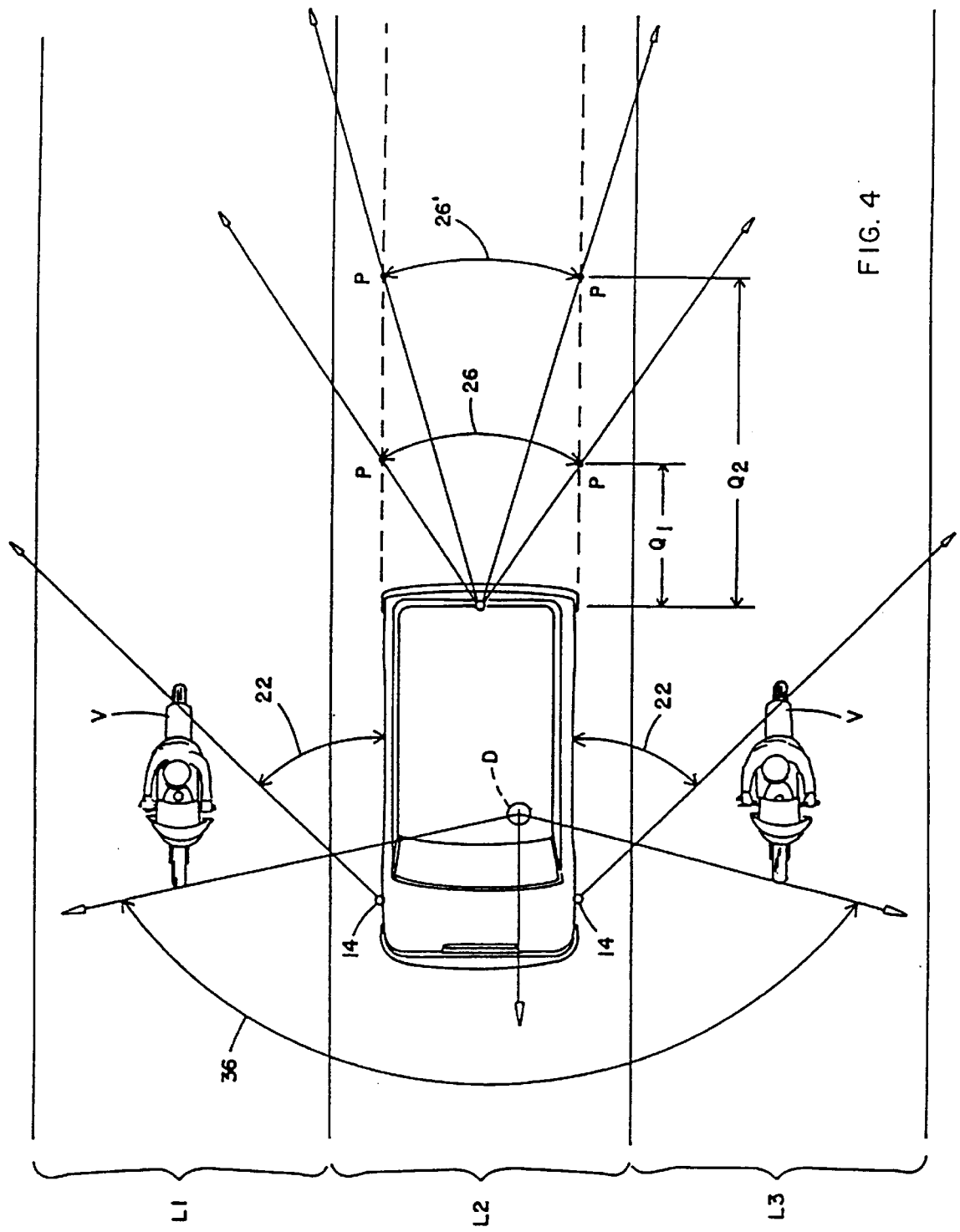
FIG. 4 is the same view as FIG. 1 illustrating an alternative embodiment of the invention.

Rear blind zones 30 are located symmetrically behind vehicle 10 extending from the rear of the vehicle to point P. Side blind zones 25 located laterally on respective sides of the vehicle extend rearwardly of the forward field of view 36 of the driver to the field of view 22 of the respective side image capture device 14. An object will not be captured by side image capture devices 14 or center image capture devices 16 if the object is entirely within one of the blind zones 25, 30. In order for an object, such as another vehicle V or other road user travelling to the side of vehicle 10, to be observed by an operator of vehicle 10, the object must be either at least partially within the forward field of view 36 of the driver or be captured by image capture devices 14, 16 and displayed on display 20. FIG. 4 illustrates vehicle 10 travelling on a three-lane highway having lanes L1, L2, and L3 with the vehicle in lane L2. Another vehicle V is shown positioned mostly within one of the blind zones 25, but with the rearmost portion of the vehicle V extending into field of view 22 where the vehicle image will be captured by one of side image capture devices 14. In the illustrated embodiment, vehicle V is a motorcycle travelling in the center of lanes L1 or L3 and represents a worst case for observing a vehicle travelling at least partially within one of the blind zones 25. In order for a portion of vehicle V to be extending either forwardly or rearwardly of the respective blind zone 25, where the vehicle V may be observed by either the forward field of view 36 of the driver or by the rearview vision system 12, the field of view 22 of side image capture devices 14 must be sufficiently wide to capture a portion of vehicle V as illustrated in FIG. 4. Preferably, the horizontal field of view 22 of side image capture devices 14 is no greater than that required to provide sufficient coverage which would be in the range of between approximately 55 degrees and approximately 70 degrees. In the illustrated embodiment, the horizontal field of view 22 is 61 degrees. In order for a portion of vehicle V to be within a vertical field of view 40 of one of side image capture devices 14, the field of view should extend to the pavement at a plane M which intersects vehicle V (FIG. 2). Preferably, vertical field of view 40 is between approximately 60 degrees and approximately 75 degrees. In the illustrated embodiment, vertical field of view 40 is 66 degrees.

A left overlap zone 32 and a right overlap zone 34 extend rearward from respective points P where the horizontal fields of view of the side image capture devices intersect the field of view of center image capture device 16. Overlap zones 32, 34 define areas within which an object will be captured both by center image capture device 16 and one of the side image capture devices 14. An object in an overlap zone 32, 34 will appear on display 20 in multiple image portions in a redundant or duplicative fashion. In order to avoid the presentation of redundant information to the driver, and thereby avoid confusion and simplify the task of extracting information from the multiple images or combined images on display 20, the object should avoid overlapping zones 32, 34. In practice, this may be accomplished to a satisfactory extent by moving points P away from the vehicle and thereby increasing distance Q. It is desirable to increase distance Q to a length that will exclude vehicles travelling at a typical separation distance behind vehicle 10 from overlapping zones 32, 34. This separation distance is usually a function of the speed at which the vehicles on the highway are travelling. The faster the vehicles are travelling, the further Q should be moved behind vehicle 10 to keep overlap zones 32 and 34 outside of the recommended vehicle spacing. If, however, the vehicles are travelling at a slower speed, then the generally accepted recommendation for vehicle spacing decreases and it is more likely that a vehicle will be within overlap zone 32, 34. Therefore, the distance Q may be selected to accommodate expected vehicle spacing for an average driving speed of vehicle 10.

Distance Q is a function of the effective horizontal field of view 26 of center image capture device 16. As field of view 26 decreases, points P move further rearward of the vehicle from a distance $Q_1$, to a distance $Q_2$, as best illustrated in FIG. 4. In order to increase distance Q to eliminate redundant and duplicative information displayed on display 20 for most driving conditions of vehicle 10, field of view 26 is preferably less than 12 degrees. In the illustrated embodiment, field of view 26 is between 6 and 8 degrees. Alternatively, distance Q may be dynamically adjusted according to some parameter, such as the speed of vehicle 10. This would allow Q to be greater when the vehicle is travelling at a faster speed, where vehicle separation tends to be larger, and vice versa. Field of view 26 may be adjusted by utilizing a selective presentation of pixels of the captured image in the displayed image.

Figure 3:
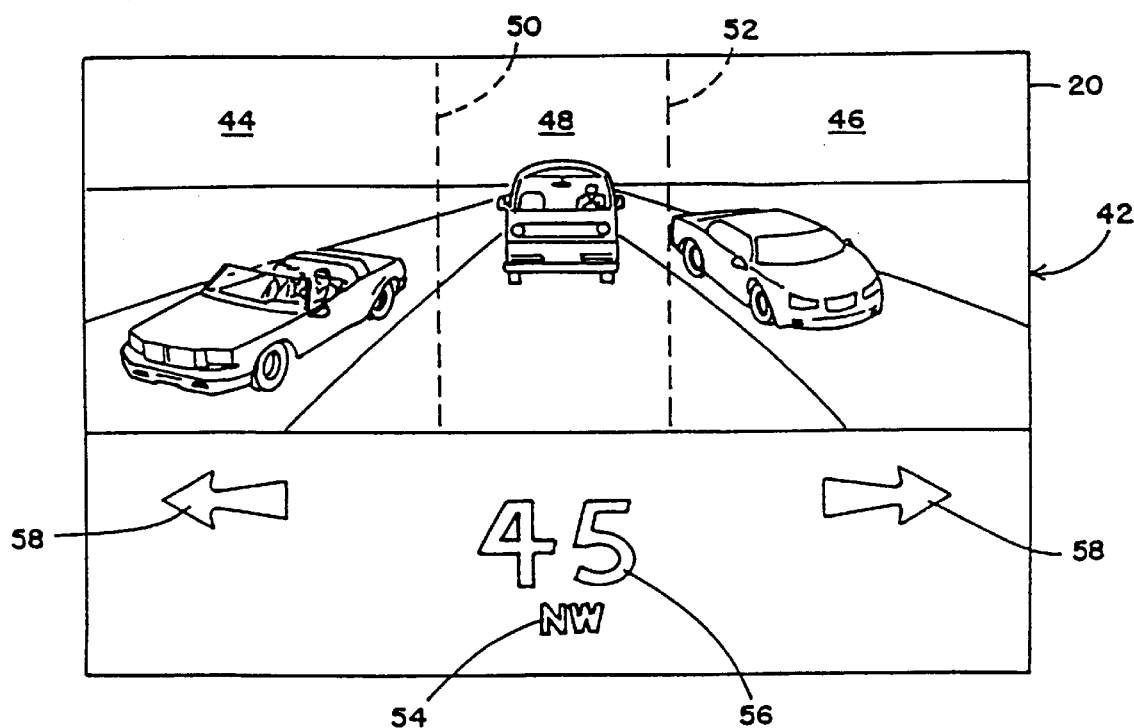
FIG. 3 is a front elevation of a display according to the invention.

Referring to FIG. 3, image display device 20 displays a composite image 42 made up of a left image portion 44, a right image portion 46, and a center image portion 48. Each image portion 44–48 is reversed from the image as captured by the respective image capture device 14, 16 utilizing conventional techniques. These techniques include reading the image in reverse with the image capture device, writing the image in reverse to display device 20, or reversing the image in image processor 18. Left image portion 44 is joined with central image portion 48 at a boundary 50. Central image portion 48 is joined with right image portion 46 at a boundary 52. As may best be seen in FIG. 3, the image portions at boundaries 50 and 52 are continuous whereby composite image 42 is a seamless panoramic view rearwardly of the vehicle. As also is apparent from FIG. 3, central image portion 48 is narrower than either left image portion 44 or right image portion 46. This is a result of reducing the horizontal field of view 26 of center image capture device 16 sufficiently to move points P, and thus overlap zones 32 and 34, a sufficient distance behind vehicle 10 to reduce redundant and duplicative images between image portions 44–48. Composite image 42 provides a clear image, which avoids confusion and simplifies the task of extracting information from the multiple image portions 44–48. As also may be seen by reference to FIG. 3, display 20 may additionally include indicia such as the readout of a compass 54, vehicle speed 56, turn signals 58, and the like as well as other graphical or video displays, such as a navigation display, a map display, and a forward-facing vision system. In this manner, rearview vision system 12 may be a compass vision system or an information vision system.

In the embodiment of rearview vision system 12 having a dynamically adjusted value of distance Q, the spacing between boundaries 50 and 52 will dynamically adjust in sequence with the adjustment of distance Q. Thus, as overlap zones 32, 34 move further away from the vehicle; for example, in response to an increase in speed of the vehicle, boundary lines 50 and 52 will move closer together and vice versa. In this manner, composite image 42 is dynamic, having image portions of dynamically adaptive sizes.

Display 20 is of a size to be as natural as possible to the driver. This is a function of the size of the display and the distance between the display and the driver. Preferably, the displayed image simulates an image reflected by a rearview mirror. As such, the size of display 20 is approximately the combined areas of the three rearview mirrors (one interior mirror and two exterior mirrors) conventionally used with vehicles. As best seen by reference to FIG. 2, display 20 is preferably positioned within the driver's physiological field of view without obstructing the view through the windshield. It is known that the driver's field of view, with the head and eyes fixed forward, extends further in a downward direction than in an upward direction. Display 20 could be located above the vertical view through the windshield wherein the display may be observed at the upward portion of the driver's field of view. However, the position for the display illustrated in FIG. 2 is preferred wherein the display is within the lower portion of the driver's field of view.

Display 20, in the illustrated embodiment, is a flat panel display, such as a back-lit liquid crystal display, a plasma display, a field emission display, or a cathode ray tube. However, the synthesized image could be displayed using other display techniques such as to provide a projected or virtual image. One such virtual display is a heads-up display. The display may be mounted/attached to the dashboard, facia or header, or to the windshield at a position conventionally occupied by an interior rearview mirror.

Although various camera devices may be utilized for image capture devices 14, 16, an electro-optic, pixelated imaging array, located in the focal plane of an optical system, is preferred. Such imaging array allows the number of pixels to be selected to meet the requirements of rearview vision system 12. The pixel requirements are related to the imaging aspect ratio of the respective image capture devices, which, in turn, are a function of the ratio of the vertical-to-horizontal field of view of the devices, as is well known in the art. In the illustrated embodiment, the imaging aspect ratio of side image capture devices 14 is 2:1 and the image aspect ratio of central image capture device 16 is variable down to 0.1:1. Such aspect ratio will produce images which will not typically match that of commercially available displays. A commercially available display may be used, however, by leaving a horizontal band of the display for displaying alpha-numeric data, such as portions of an instrument cluster, compass display, or the like, as illustrated in FIG. 3.

In the illustrated embodiment, image capture devices 14, 16 are CMOS imaging arrays of the type manufactured by VLSI Vision Ltd. of Edinburgh, Scotland, which are described in more detail in co-pending U.S. patent application Ser. No. 08/023,918 filed Feb. 26, 1993, by Kenneth Schofield and Mark Larson for an AUTOMATIC REAR-VIEW MIRROR SYSTEM USING A PHOTOSENSOR ARRAY, the disclosure of which is hereby incorporated herein by reference. However, other pixelated focal plane image-array devices, which are sensitive to visible or invisible electromagnetic radiation, could be used. The devices could be sensitive to either color or monochromatic visible radiation or near or far infrared radiation of the type used in night-vision systems. Each image capture device could be a combination of different types of devices, such as one sensitive to visible radiation combined with one sensitive to infrared radiation. Examples of other devices known in the art include charge couple devices and the like.

Preferably, image capture devices 14 and 16 are all mounted at the same vertical height on vehicle 10, although compromise may be required in order to accommodate styling features of the vehicle. The horizontal aim of image capture devices 14 and 16 is preferably horizontal. However, the portion of the image displayed is preferably biased toward the downward portion of the captured image because significantly less useful information is obtained above the horizontal position of the image capture devices.

Each image-capturing device 14, 16 is controlled by appropriate supporting electronics (not shown) located in the vicinity of the imaging array such that, when operating power is supplied, either an analog or a digital data stream is generated on an output signal line supplied to image processor 18. The support electronics may be provided partially on the image chip and partially on associated electronic devices. For each exposure period, a value indicative of the quantity of light incident on each pixel of the imaging array during the exposure period is sequentially outputted in a predetermined sequence, typically row-by-row. The sequence may conform to video signal standards which support a direct view such that, when a scene is viewed by an image-capturing device, the image presented on a display represents directly the scene viewed by the image-capturing devices. However, when looking forward and observing a displayed image of a rearward scene, the driver will interpret the image as if it were a reflection of the scene as viewed through a mirror. Objects to the left and rearward of the vehicle, as viewed by the rearward-looking camera, are presented on the left-hand side of the display and vice versa. If this reversal is effected in image processor 18, it may be by the use of a data storage device, or buffer, capable of storing all of the pixel values from one exposure period. The data is read out of the data storage device in a reversed row sequence. Alternatively, the imaging array electronics could be constructed to provide the above-described reversal at the image-capturing device or at the display.

Data transmission between image capture devices 14, 16 and image processor 18 and/or between image processor 18 and display 20 may be by electrically conductive leads or fiber-optic cable. It is possible, for particular applications, to eliminate image processor 18 and direct drive display 20 from image capture devices 14, 16 at the pixel level.

The data streams from image-capturing devices 14, 16 are combined in image processor 18 and directly mapped to the pixel array of display 20. This process is repeated preferably at a rate of at least 30 times per second in order to present an essentially real time video image. The image captured by side image capture device 14 on the right side of the vehicle is presented in right image portion 46 and the image from side image capture device 14 on the left side of the vehicle is displayed on left image portion 44. The image from center image capture device 16 is displayed on central image portion 48. The three image portions 44–48 are presented in horizontal alignment and adjacent to each other. However, the composite image may be positioned at any desired vertical position in the display 20. It is also possible to display image portions 44–48 on separate image devices which are adjacent each other.

Figure 7:
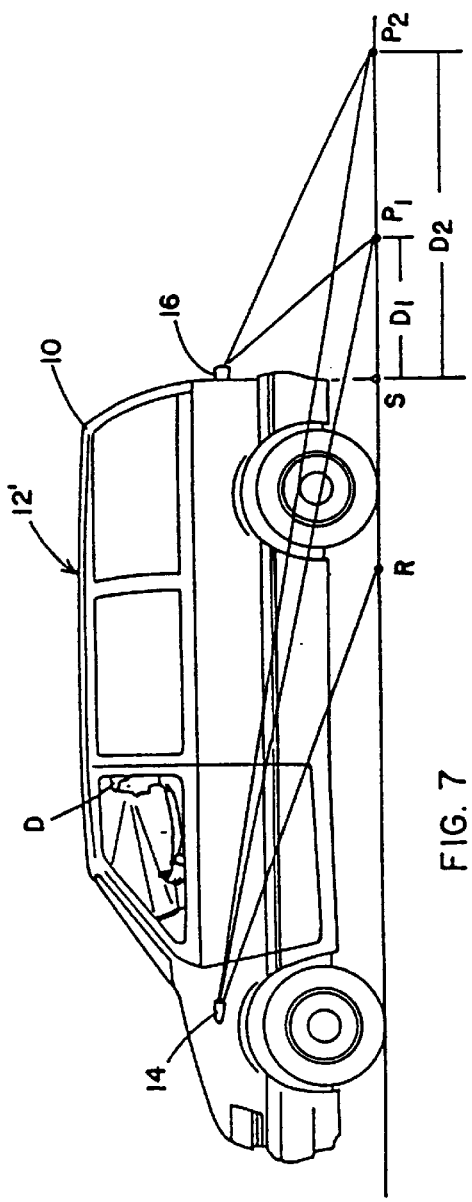
FIG. 7 is the same view as FIG. 2 illustrating an alternative embodiment of the invention.

In vision system 12, side image capture devices 14 are positioned preferably at a forward longitudinal position on vehicle 10 and center image capture device 16 is positioned at a rearward longitudinal position on the vehicle. As best seen by reference to FIG. 7, this positioning creates a difference in the vertical angle between each side image capture device 14 and center image capture device 16 with respect to a fixed location $P_1$ that is a distance $D_1$ behind the vehicle. This difference in sensing angle will cause each side image capture device 14 to image an object located at $P_1$ on a horizontal row of pixels that is different from the horizontal row of pixels that center image capture device 16 will image the same object. If the image is below the horizontal centerline of the image capture device, it will be imaged on a lower row of pixels by center image capture device 16 than the row of pixels it will be imaged by the side image capture devices 14, as illustrated in FIG. 7. This mismatch between horizontal pixel rows of the captured image is furthermore a function of the distance of the captured image from the rear of the vehicle. This can be understood by reference to FIG. 11 which presents a chart 90 having a first column 92 of pixel lines n1, measured from the array centerline, at which an object will be imaged by side image capture device 14 and a second column 94 of pixel lines n2, measured from the array vertical centerline, at which the same object will be imaged by center image capture device 16. The result is that an object, which is captured by both side and center image capture devices 14, 16, will be vertically disjointed at the boundary of the displayed image, if the object is captured by more than one image capture device. The amount of disjointment will be greater closer to the vehicle and less at further distances. If the object is elongated in the horizontal direction, such as earth's horizon, bridges, or cross-markings on highways, then the object will appear to be either broken or crooked.

Figure 8:
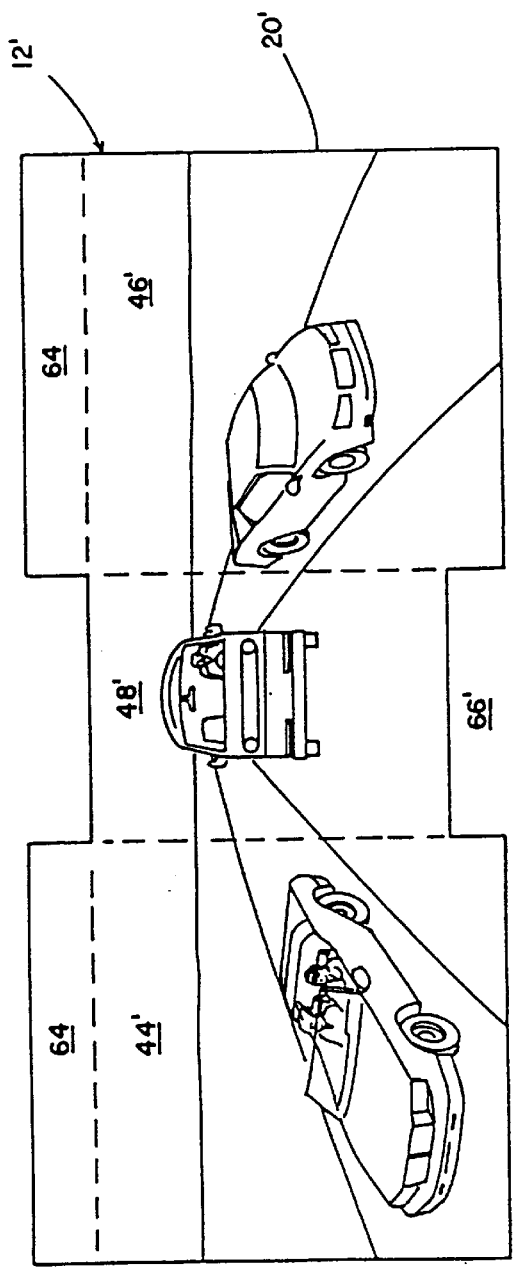
FIG. 8 is the same view as FIG. 3 illustrating an alternative embodiment of the invention.
Figure 9:
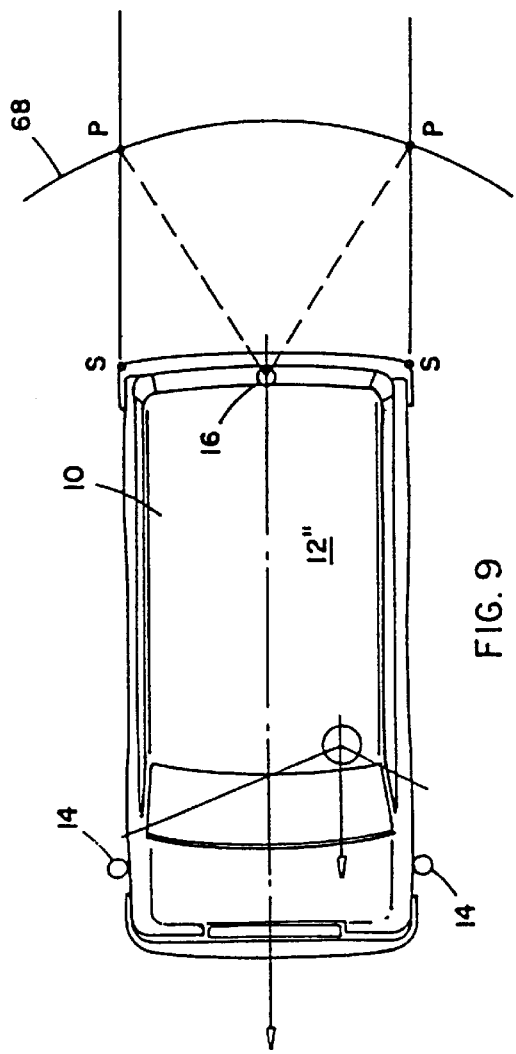
FIG. 9 is the same view as FIGS. 1 and 4 illustrating an alternative embodiment of the invention.

In order to provide uniform display of laterally elongated images, a rearview vision system 12' is provided having a central image portion 48' which is processed differently from the image display portions 44' and 46' produced by the side image capture devices (FIG. 8). Central image portion 48' is reduced vertically, or compressed, by removing specified scan lines, or pixel rows, from the image captured by center image capture device 16 in a graduated fashion. The difference in the pixel line at which an object will be imaged by each of the side and center image capture devices is a function of the distance D of the object from the rear of the vehicle, with a greater variation occurring at shorter distances and the variation reducing to zero for infinite distances. Therefore, the compression of central image portion 48' is non-linear, with substantially no compression at the vertical center of the image and greater compression at greater distances above and below the vertical center point of the image. This is accomplished by removing specific lines from the center display in a graduated fashion with a greater number of lines removed further from the vertical center of the image. The removed lines may be merely discarded in order to vertically reduce the image. Alternatively, the data contained in the removed lines may be utilized to modify the value of adjacent pixels above and below the removed line in order to enhance the quality of the compressed image. Averaging, median filtering, or other such known techniques may also be used.

Each of right image portion 46' and left image portion 44' includes an upper portion 64 which extends above the compressed upper portion of the central image portion 48'. In the illustrated embodiment, upper portions 64 are deleted in order to present a uniform upper horizontal boundary for display 20'. In the illustrated embodiment, the mismatch between the lower horizontal boundary of central image portion 48' and each of the left and right image portions provides a dead space 66 which provides a visual prompt to the user of the approximate location of the rearward corners S of vehicle 10. This dead space 66 in the image displayed on display 20' approximates the footprint occupied by vehicle 10 when viewed from point C. This is particularly useful because it provides a visual indication to the driver that a vehicle passing vehicle 10, as viewed in either left image portion 44' or right image portion 46', is at least partially adjacent vehicle 10 if the image of the approaching vehicle is partially adjacent to dead space 66.

In an alternative embodiment, the vertical compression technique may be applied to only a lower vertical portion of central image portion 48'. In most driving situations, objects imaged by rearward-facing image capture devices above the horizon are at a long distance from the vehicle while those below the horizon get progressively closer to the vehicle in relation to the distance below the horizon in the displayed image. Therefore, compression of the upper vertical portion of the central image portion may be eliminated without significant reduction in performance.

Compression of the central image portion may also advantageously be provided horizontally, as well as vertically. Spatial separation of center image capture device 16 from side image capture devices 14 causes similar distortion, as that described above, in the horizontal direction. This effect is spherical in nature and would require a more complex corrective action, such as compressing the image based upon the removal of pixels from an approximation to concentric circles centered on the center of the imaging array, or other techniques which would be apparent to those skilled in the art.

Figure 10:
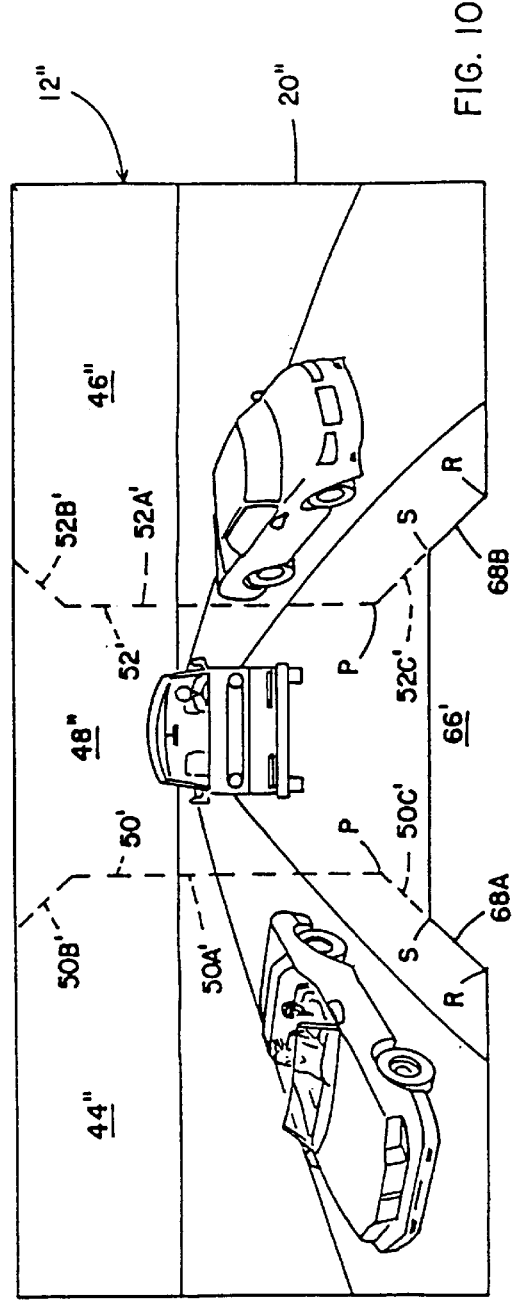
FIG. 10 is the same view as FIGS. 3 and 8 illustrating an alternative embodiment of the invention.

A rearview vision system 12" includes an image display 20" having a compressed central image portion 48" and left and right image portions 44" and 46", respectively (FIG. 10). A border 50' between left side image 44" and central image 48" includes a vertical central border portion 50a', an upper border portion 50b', and a lower border portion 50c'. Upper border portion 50b' and lower border portion 50c' diverge laterally outwardly, vertically away from central portion 50a'. A border 52' between central image portion 48" and right image portion 46" includes a central boundary portion 52a', an upper boundary portion 52b', and a lower boundary portion 52c'. Upper boundary portion 52b' and lower boundary portion 52c' diverge laterally outwardly vertically away from central portion 52a'. This creates an upper portion of central image portion 48" and a lower portion of central image portion 48" which extend beyond the center portion thereof. This configuration is based upon the realization that the surface of the road immediately behind the vehicle is captured by central image capture device 16. Likewise, the horizontal plane above the vehicle, which is symmetrical with the road surface, is captured by the center image capture device. This may be seen by referring to point P in FIG. 10, which illustrate the points where the effective radius 68 of the virtual image capture device intersects dead zones 30 and by referring to point S in FIG. 10 which illustrates the corners or the rear of the vehicle (S).

The image displayed on display 20" includes a dead space 66' having diverging lateral sides 68a, 68b. Diverging sides 68a and 68b are configured in order to extend in the direction of travel of vehicle 10 which is parallel to lane markings of a highway on which vehicle 10 is travelling. This further enhances the visual perception of the driver by providing a visual clue of the location of images appearing on display 20" with respect to the vehicle 10. Side portions 68a, 68b, in the illustrated embodiment, are natural extensions of lower boundary portions 50c' and 52c' and extend from point S on each respective side of the vehicle to point R, which represents the intersection of the lower extent of the vertical field of view 40 of each side image capture device 14 with the pavement (FIG. 7).

Rearview vision systems 12' and 12" utilize a displayed synthesized image which takes into account the use of perspective in enhancing the driver's understanding of what is occurring in the area surrounding the vehicle. The images produced on displays 20' and 20" effectively remove the vehicle bodywork and replace the bodywork with a vehicle footprint as would be viewed by virtual camera C. The image displayed on display 20" further includes perspective lines which further enhance the roll of perspective in the driver's understanding of what is occurring.

Figure 6:
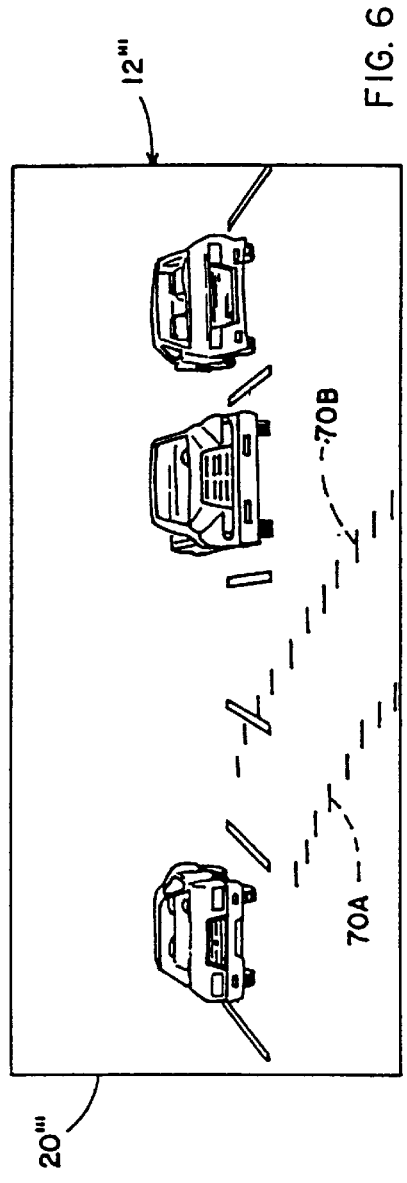
FIG. 6 is the same view as FIG. 3 illustrating an alternate mode of operation of the system.
Figure 5:
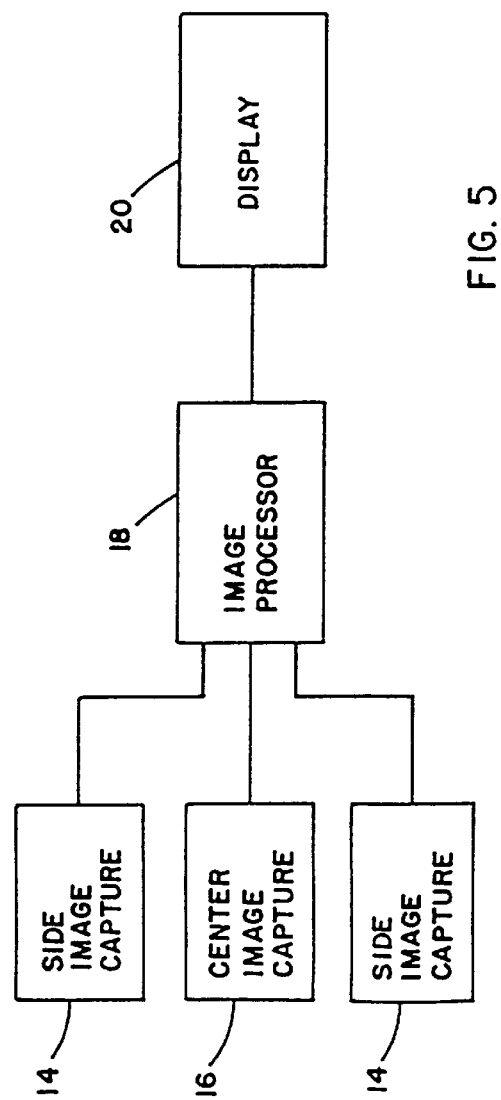
FIG. 5 is a block diagram of an electronic system according to the invention.

In order to further enhance the driver's understanding of what is occurring in the area surrounding the vehicle, a rearview vision system 12''' includes a display 20''' having image enhancements (FIG. 6). In the illustrative embodiment, such image enhancements include graphic overlays 70a, 70b which are hash marks intended to illustrate to the driver the anticipated path of movement of vehicle 10. In the illustrated embodiment, the anticipated vehicle motion is a function of the vehicle direction of travel as well as the rate of turn of the vehicle. The forward or rearward direction of vehicle travel is determined in response to the operator placing the gear selection device (not shown) in the reverse gear position. The degree of turn of the vehicle may be determined by monitoring the movement of the vehicle steering system, monitoring the output of an electronic compass, or monitoring the vehicle differential drive system. In the embodiment illustrated in FIG. 6, the configuration of graphic overlays 70a, 70b indicates that the vehicle is in reverse gear and that the wheels are turned in a manner that will cause the vehicle to travel toward the driver's side of the vehicle. If the wheels were turned in the opposite direction, graphic overlays 70a, 70b would curve clockwise toward the right as viewed in FIG. 6. If the vehicle's wheels were straight, graphic overlays 70a, 70b would be substantially straight converging lines. If the vehicle is not in reverse gear position, graphic overlays 70a, 70b are not presented. Other types of graphic overlays of the displayed image are comprehended by the invention.

Horizontal grid markings on the display may be provided to indicate distances behind the vehicle at particular markings. Such grid would allow the driver to judge the relative position of vehicles behind the equipped vehicle. In one embodiment, short horizontal lines are superimposed on the displayed image at regular rearward intervals in horizontal positions which correspond to the boundaries of the lane in which the vehicle is travelling. In order to avoid confusion when the vehicle is travelling in a curved path, from a lack of correspondence between the graphic overlay and the road, a signal indicative of the vehicle's rate of turn may be taken into account when generating the graphic overlay. In this manner, the distance indications may be moved laterally, with reduced horizontal separation, to correspond to the positions of the curved lane boundaries and vertically on the image to compensate for the difference between distances along a straight and curved path.

Another image enhancement is to alter the appearance of an object in a particular zone surrounding the vehicle in order to provide an indication, such as a warning, to the driver. As an example, a vehicle that is too close to the equipped vehicle for safe-lane change, may be displayed in a particular color, such as red, may flash, or otherwise be distinguishable from other images on the display. Preferably, the speed of the equipped vehicle 10, which may be obtained from known speed transducers, may be provided as an input to the rearview vision system in order to cause such warning to be a function of the vehicle speed which, in turn, affects the safe separation distance of vehicles. The operation of the turn signal may also be used to activate such highlighting of other road users or to modify the scope of the image displayed. In order to determine the distance of objects behind vehicle 10, a separate distance-measuring system may be used. Such separate system may include radar, ultrasonic sensing, infrared detection, and other known distance-measuring systems. Alternatively, stereoscopic distance-sensing capabilities of side image capture devices 14 may be utilized to determine the separation distance from trailing objects utilizing known techniques.

Thus, it is seen that the image displayed on display 20–20''' may be different under different circumstances. Such different circumstances may relate to the vehicle's direction of travel, speed, rate of turn, separation from adjacent objects, and the like.

Various other forms of image processing may be utilized with rearview vision system 12–12'''. Luminant and chrominant blending may be applied to the images captured by image capture devices 14, 16 in order to produce equality of the image data whereby the image portions appear as if they were produced by one image capture device. The dynamic range of the image capture devices may be extended in order to provide high quality images under all lighting conditions. Furthermore, individual pixel groups may be controlled in order to selectively compensate for bright or dark spots. For example, anti-blooming techniques may be applied for bright spots. Multiple exposure techniques may be applied to highlight dark areas. Image morphing and warping compensation techniques may additionally be applied. Resolution of the image capture devices and display may be selected in order to provide sufficient image quality for the particular application.

A heater may be applied to each image capture device in order to remove dew and frost that may collect on the optics of the device. Although, in the illustrative embodiment, the optical centerline of the camera coincides with the field of view, particular applications may result in the centerline of the camera pointing in a direction other than the centerline of the field of view. Although, in the illustrative embodiment, the image capture devices are fixed, it may be desirable to provide selective adjustability to the image capture devices or optical paths in particular applications. This is particularly desirable when the system is used on articulated vehicles where automated and coordinated camera aim may be utilized to maintain completeness of the synthesized image.

When operating the vehicle in the reverse direction, it may be desirable to provide additional data concerning the area surrounding the immediate rear of the vehicle. This may be accomplished by utilizing non-symmetrical optics for the center image capture device in order to provide a wide angle view at a lower portion of the field of view. Alternatively, a wide angle optical system could be utilized with the electronic system selectively correcting distortion of the captured image. Such system would provide a distortion-free image while obtaining more data, particularly in the area surrounding the back of the vehicle.

The invention additionally comprehends the use of more than three image capture devices. In addition to side image capture devices positioned at the front sides of the vehicle and a center image capture device positioned at the center rear of the vehicle, additional image capture devices may be useful at the rear corners of the vehicle in order to further eliminate blind spots. It may additionally be desirable to provide an additional center image capture device at a higher elevation in order to obtain data immediately behind the vehicle and thereby fill in the road surface detail immediately behind the vehicle. Such additional detail is particularly useful when operating the vehicle in the reverse direction. Of course, each of the image capture devices could be a combination of two or more image capture devices.

Although the present invention is illustrated as used in a rearview vision system, it may find utility in other applications. For example, the invention may be useful for providing security surveillance in an area where a building or other object obstructs the view of the area under surveillance. Additionally, the invention may find application in night-vision systems and the like. For example, the invention may be applied to forward-facing night-vision systems, or other vision enhancement systems such as may be used in adverse weather or atmospheric conditions such as fog, applied to provide an enhanced display of a synthesized image, which approximates a forward-facing view from a single virtual camera located rearwardly of the driver, taking advantage of the perspective features of the image.

Thus, it is seen that the present invention enhances the relationship between the driver's primary view and the image presented on the rearview vision system. This is accomplished in a manner which provides ease of interpretation while avoiding confusion so that the driver does not have to concentrate or look closely at the image. In this manner, information presented on the display is naturally assimilated. This is accomplished while reducing blind spots so that other vehicles or objects of interest to the driver will likely be displayed to the driver. Additionally, the use of perspective allows distances to be more accurately determined.

Changes and modifications in the specifically described embodiments can be carried out without departing from the principles of the invention, which is intended to be limited only by the scope of the appended claims, as interpreted according to the principles of patent law including the doctrine of equivalents.

The embodiments of the invention in which an exclusive property or privilege is claimed are defined as follows:

1. A rearview vision system for a vehicle having a gear actuator, comprising:

an image capture device mounted at the rear of the vehicle and having a field of view directed rearwardly of the vehicle;

a display system viewable by a driver of the vehicle which displays a rearward image output of said image capture device;

a graphic overlayer superimposed on said rearward image when the gear actuator of the vehicle selects a reverse gear; and wherein said graphic overlayer includes indicia of the anticipated path of travel of the vehicle.

2. The rearview system of claim 1 wherein said indicia responds to the direction of turn of the vehicle.

3. The rearview system of claim 1 wherein said indicia responds to at least one of the vehicle's steering system, the vehicle's differential system and a compass.

4. The rearview system of claim 1 wherein said graphic overlayer is not superimposed on said rearward image when the gear actuator of the vehicle does not select a reverse gear.

5. The rearview system of claim 1 wherein said indicia comprise markings that provide indication of distance behind the vehicle.

6. The rearview system of claim 1 wherein said indicia comprise markings superimposed at intervals on said rearward image corresponding to the boundaries of the lane in which the vehicle is reversing.

7. The rearview system of claim 6 wherein said graphic overlayer is responsive to a signal indicative of the rate of turn of the vehicle.

8. The rearview system of claim 1 wherein said graphic overlayer is responsive to a signal indicative of the rate of turn of the vehicle.

9. The rearview system of claim 1 wherein said graphic overlayer comprises markings that move laterally on said rearward image, with reduced separation, to correspond to positions of a curved lane boundary and vertically on said rearward image to compensate for the difference between distances along a straight and curved path.

10. The rearview system of claim 1 wherein said rearview vision system includes a distance-sensing system.

11. The rearview system of claim 10 wherein said distance-sensing system is selected from the group consisting of a radar, an ultrasonic sensing, and an infrared detection distance-measuring system.

12. The rearview system of claim 1 wherein said image capture device has a field of view which is symmetrical about the longitudinal axis of the vehicle.

13. The rearview system of claim 1 wherein said image capture device comprises a pixilated imaging array.

14. The rearview system of claim 13 wherein said pixilated array comprises a CMOS imaging array.

15. The rearview system of claim 1 wherein said graphic overlayer has a form that is a function of at least one of the direction of travel and speed of the vehicle.

16. The rearview system of claim 15 wherein said indicia comprises at least one mark superimposed on said rearward image.

17. The rearview system of claim 1 wherein said rear vision system includes a monitoring device for monitoring vehicle turning.

18. The rearview system of claim 17 wherein said monitoring device comprises one of a monitor of movement of the vehicle's steering system, a monitor of an output of an electronic compass and a monitor of the vehicle's differential drive system.

19. The rearview system of claim 1 wherein said display system comprises one of a flat panel display and a cathode ray tube.

20. The rearview system of claim 1 wherein said display system comprises a flat panel display.

21. The rearview system of claim 20 wherein said flat panel display comprises one of a liquid crystal display, a plasma display and a field emission display.

22. The rearview system of claim 20 wherein said flat panel display comprises a liquid crystal display.

23. The rearview system of claim 1 wherein said display system is positioned within the field of view of the driver without obstructing the view through the windshield.

24. The rearview system of claim 1 wherein said display system is mounted to one of the dashboard, facia, header and windshield of the vehicle.

25. The rearview system of claim 1 wherein said display system is mounted at a position conventionally occupied by an interior rearview mirror.

26. The rearview system of claim 1 wherein said display system comprises a display of one of a projected and a virtual image.

27. The rearview system of claim 1 wherein said display system comprises a heads-up display.

28. The rearview system of claim 1 wherein said indicia comprises at least one mark superimposed on said rearward image.

29. The rearview system of claim 28 wherein said at least one mark superimposed on said rearward image comprises a plurality of marks superimposed on said rearward image at rearward intervals.

30. The rearview system of claim 29 wherein said plurality of marks superimposed on said rearward image are positioned to correspond to boundaries of the lane in which the vehicle is traveling.

31. The rearview system of claim 29 wherein said plurality of marks are moved laterally to correspond to positions of curved lane boundaries when the vehicle is turning.

32. A rearview vision system for a vehicle having a gear actuator, comprising:

an image capture device mounted at the rear of the vehicle and having a field of view directed rearwardly of the vehicle;

a display system viewable by a driver of the vehicle which displays a rearward image output of said image capture device;

a graphic overlayer superimposed on said rearward image when the gear actuator of the vehicle selects a reverse gear; and wherein said graphic overlayer is disabled when the gear actuator of the vehicle is not in reverse gear.

33. The rearview system of claim 32 wherein said graphic overlayer includes indicia of the anticipated path of travel of the vehicle.

34. The rearview system of claim 33 wherein said indicia responds to at least one of the vehicle's steering system, the vehicle's differential system and a compass.

35. The rearview system of claim 33 wherein said indicia responds to the direction of turn of the vehicle.

36. The rearview system of claim 33 wherein said indicia comprise markings that provide indication of distance behind the vehicle.

37. The rearview system of claim 33 wherein said indicia comprise markings superimposed at intervals on said rearward image corresponding to the boundaries of the lane in which the vehicle is reversing.

38. The rearview system of claim 37 wherein said graphic overlayer is responsive to a signal indicative of the rate of turn of the vehicle.

39. The rearview system of claim 32 wherein said graphic overlayer is responsive to a signal indicative of the rate of turn of the vehicle.

40. The rearview system of claim 32 wherein said indicia comprise markings that move laterally on said rearward image, with reduced separation, to correspond to positions of a curved lane boundary and that move vertically on said rearward image to compensate for the difference between distances along a straight and curved path.

41. The rearview system of claim 32 wherein said rearview vision system includes a distance-sensing system.

42. The rearview system of claim 41 wherein said distance-sensing system is selected from the group consisting of a radar, an ultrasonic sensing, and an infrared detection distance-measuring system.

43. The rearview system of claim 32 wherein said image capture device has a field of view which is symmetrical about the longitudinal axis of the vehicle.

44. The rearview system of claim 32 wherein said image capture device comprises a pixilated imaging array.

45. The rearview system of claim 44 wherein said pixilated array comprises a CMOS imaging array.

46. The rearview system of claim 33 wherein said graphic overlayer has a form that is a function of at least one of the direction of travel and speed of the vehicle.

47. The rearview system of claim 46 wherein said indicia comprises at least one mark superimposed on said rearward image.

48. The rearview system of claim 32 wherein said rear vision system includes a monitoring device for monitoring vehicle turning.

49. The rearview system of claim 48 wherein said monitoring device comprises one of a monitor of movement of the vehicle's steering system, a monitor of an output of an electronic compass and a monitor of the vehicle's differential drive system.

50. The rearview system of claim 32 wherein said display system comprises one of a flat panel display and a cathode ray tube.

51. The rearview system of claim 32 wherein said display system comprises a flat panel display.

52. The rearview system of claim 51 wherein said flat panel display comprises one of a liquid crystal display, a plasma display and a field emission display.

53. The rearview system of claim 51 wherein said flat panel display comprises a liquid crystal display.

54. The rearview system of claim 32 wherein said display system is positioned within the field of view of the driver without obstructing the view through the windshield.

55. The rearview system of claim 32 wherein said display system is mounted to one of the dashboard, facia, header and windshield of the vehicle.

56. The rearview system of claim 32 wherein said display system is mounted at a position conventionally occupied by an interior rearview mirror.

57. The rearview system of claim 32 wherein said display system comprises a display of one of a projected and a virtual image.

58. The rearview system of claim 32 wherein said display system comprises a heads-up display.

59. The rearview system of claim 33 wherein said indicia comprises at least one mark superimposed on said rearward image.

60. The rearview system of claim 59 wherein said at least one mark superimposed on said rearward image comprises a plurality of marks superimposed on said rearward image at rearward intervals.

61. The rearview system of claim 60 wherein said plurality of marks superimposed on said rearward image are positioned to correspond to boundaries of the lane in which the vehicle is traveling.

62. The rearview system of claim 60 wherein said plurality of marks are moved laterally to correspond to positions of curved lane boundaries when the vehicle is turning.

63. A rearview vision system for a vehicle having a gear actuator, comprising:

an image capture device mounted at the rear of the vehicle and having a field of view directed rearwards of the vehicle;

a display system viewable by a driver of the vehicle;

said image capture device utilizing a wide angle optical system in order to provide a wide angle view of an area rearwards of the vehicle wherein said wide angle optical system comprises non-symmetrical optics; and wherein said display system displays a rearward image output of said image capture device when the gear actuator of the vehicle selects a reverse gear to operate the vehicle in reverse and wherein said display of said rearward image output of said image capture device is disabled when the vehicle's gear actuator is not in reverse gear.

64. The rearview system of claim 63 wherein said wide angle view comprises a view at a lower portion of said rearwards directed field of view of said image capture device.

65. The rearview system of claim 64 wherein said wide angle view comprises an area at the back of the vehicle.

66. The rearview system of claim 65 wherein the output of said image capture device is corrected for distortion in the image captured by said wide angle optical system.

67. The rearview system of claim 66 wherein said correction of said distortion is achieved electronically.

68. The rearview system of claim 65 wherein said rearview vision system includes a distance-measuring system.

69. The rearview system of claim 68 wherein said distance-measuring system is selected from the group consisting of a radar, an ultrasonic sensing, and an infrared detection distance-measuring system.

70. The rearview system of claim 65 wherein said image capture device has a field of view which is symmetrical about the longitudinal axis of the vehicle.

71. The rearview system of claim 65 wherein said image capture device comprises a pixelated imaging array.

72. The rearview system of claim 71 wherein said pixelated array comprises a CMOS imaging array.

73. The rearview system of claim 65 wherein said display system comprises one of a flat panel display and a cathode ray tube.

74. The rearview system of claim 65 wherein said display system comprises a flat panel display.

75. The rearview system of claim 74 wherein said flat panel display comprises one of a liquid crystal display, a plasma display and a field emission display.

76. The rearview system of claim 75 wherein said flat panel display comprises a liquid crystal display.

77. The rearview system of claim 65 wherein said display system is positioned within the field of view of the driver without obstructing the view through the windshield.

78. The rearview system of claim 65 wherein said display system is mounted to one of the dashboard, facia, header and windshield of the vehicle.

79. The rearview system of claim 65 wherein said display system is mounted at a position conventionally occupied by an interior rearview mirror.

80. The rearview system of claim 65 wherein said display system comprises display of one of a projected and a virtual image.

81. The rearview system of claim 65 wherein said display system comprises a heads-up display.

82. A rearview vision system for a vehicle having a gear actuator, comprising:

an image capture device mounted at the rear of the vehicle and having a field of view directed rearwards of the vehicle;

a display system viewable by a driver of the vehicle;

said image capture device utilizing a wide angle optical system comprising non-symmetrical optics in order to provide a wide angle view of an area rearwards of the vehicle; and wherein said display system displays a rearward image output of said image capture device when the gear actuator of the vehicle selects a reverse gear to operate the vehicle in reverse.

83. The rearview system of claim 82 wherein said wide angle view comprises a view at a lower portion of said rearwards directed field of view of said image capture device.

84. The rearview system of claim 83 wherein said wide angle view comprises an area at the back of the vehicle.

85. The rearview system of claim 82 wherein said display of said rearward image output of said image capture device is disabled when the vehicle's gear actuator is not in reverse gear.

86. The rearview system of claim 82 wherein the output of said image capture device is corrected for distortion in the image captured by said wide angle optical system.

87. The rearview system of claim 86 wherein said correction of said distortion is achieved electronically.

88. The rearview system of claim 82 wherein said rearview vision system includes a distance-measuring system.

89. The rearview system of claim 88 wherein said distance-measuring system is selected from the group consisting of a radar, an ultrasonic sensing, and an infrared detection distance-measuring system.

90. The rearview system of claim 82 wherein said image capture device has a field of view which is symmetrical about the longitudinal axis of the vehicle.

91. The rearview system of claim 82 wherein said image capture device comprises a pixelated imaging array.

92. The rearview system of claim 91 wherein said pixelated array comprises a CMOS imaging array.

93. The rearview system of claim 82 wherein said display system comprises one of a flat panel display and a cathode ray tube.

94. The rearview system of claim 82 wherein said display system comprises a flat panel display.

95. The rearview system of claim 94 wherein said flat panel display comprises one of a liquid crystal display, a plasma display and a field emission display.

96. The rearview system of claim 95 wherein said flat panel display comprises a liquid crystal display.

97. The rearview system of claim 82 wherein said display system is positioned within the field of view of the driver without obstructing the view through the windshield.

98. The rearview system of claim 82 wherein said display system is mounted to one of the dashboard, facia, header and windshield of the vehicle.

99. The rearview system of claim 82 wherein said display system is mounted at a position conventionally occupied by an interior rearview mirror.

100. The rearview system of claim 82 wherein said display system comprises display of one of a projected and a virtual image.

101. The rearview system of claim 82 wherein said display system comprises a heads-up display.

* * * * *

UNITED STATES PATENT AND TRADEMARK OFFICE
CERTIFICATE OF CORRECTION

| | | |
|---|---|---|
| PATENT NO. | : 6,222,447 C1 | Page 1 of 15 |
| APPLICATION NO. | : 90/007519 | |
| DATED | : March 15, 2011 | |
| INVENTOR(S) | : Kenneth Schofield, Mark L. Larson and Keith J. Vadas | |

It is certified that error appears in the above-identified patent and that said Letters Patent is hereby corrected as shown below:

In the Claims

Column 1, line 26, Claim 4 should read

4.  *A* [[The]] rearview *vision* system [[of claim 1]] *for a vehicle having a gear actuator, comprising:*
    an image capture device mounted at the rear of the vehicle and having a field of view directed rearwardly of the vehicle;
    a display system viewable by a driver of the vehicle which displays a rearward image output of said image capture device;
    a graphic overlayer superimposed on said rearward image when the gear actuator of the vehicle selects a reverse gear;
    wherein said graphic overlayer includes indicia of the anticipated path of travel of the vehicle; *and*
    wherein said graphic overlayer is not superimposed on said rearward image when the gear actuator of the vehicle does not select a reverse gear.

Column 1, line 49, Claim 36 should read

36.  *A* [[The]] rearview *vision* system [[of claim 33]] *for a vehicle having a gear actuator, comprising:*
    an image capture device mounted at the rear of the vehicle and having a field of view directed rearwardly of the vehicle;
    a display system viewable by a driver of the vehicle which displays a rearward image output of said image capture device;
    a graphic overlayer superimposed on said rearward image when the gear actuator of the vehicle selects a reverse gear;
    wherein said graphic overlayer is disabled when the gear actuator of the vehicle is not in reverse gear; and
    wherein said graphic overlayer includes indicia of the anticipated path of travel of the vehicle and Signed and Sealed this
Eighth Day of April, 2014

Michelle K. Lee
*Deputy Director of the United States Patent and Trademark Office* wherein said indicia comprise markings that provide indication of distance behind the vehicle.

Column 2, line 5, Claim 44 should read

44. The rearview system of claim 32 wherein said image capture device comprises a [[pixilated]] *pixelated* imaging array.

Column 2, line 8, Claim 45 should read

45. *A* [[The]] rearview *vision* system [[of claim 44]] *for a vehicle having a gear actuator, comprising:*
    *an image capture device mounted at the rear of the vehicle and having a field of view directed rearwardly of the vehicle, wherein said image capture device comprises a pixelated imaging array and* wherein said [[pixilated]] *pixelated* array comprises a CMOS imaging array;
    *a display system viewable by a driver of the vehicle which displays a rearward image output of said image capture device;*
    *a graphic overlayer superimposed on said rearward image when the gear actuator of the vehicle selects a reverse gear; and*
    *wherein said graphic overlayer is disabled when the gear actuator of the vehicle is not in reverse gear.*

Column 2, line 40, Claim 102 should read

*102. A rearview vision system for a vehicle having a gear actuator, said rearview vision system comprising:*
    *an image capture device mounted at the rear of the vehicle and having a field of view directed rearwardly of the vehicle;*
    *a display system viewable by an operator of the vehicle which displays a rearward image output of said image capture device;*
    *a graphic overlay superimposed on said rearward image when the operator of the equipped vehicle positions a gear actuator of the vehicle in a reverse gear;*
    *wherein said graphic overlay is not superimposed on said rearward image when the gear actuator of the vehicle is not positioned in a reverse gear; and*
    *wherein said graphic overlay includes indicia of the anticipated path of travel of the vehicle.*

Column 3, line 6, Claim 103 should read

*103. A rearview vision system for a vehicle having a gear actuator, said rearview vision system comprising:*
    *an image capture device mounted at the rear of the vehicle and having a field of view directed rearwardly of the vehicle;*
    *a display system viewable by an operator of the vehicle which displays a rearward image output of said image capture device;*
    *a graphic overlay superimposed on said rearward image when the operator of the equipped vehicle positions a gear actuator of the vehicle in a reverse gear;*

*wherein said graphic overlay includes indicia of the anticipated path of travel of the vehicle, and wherein said indicia comprise markings that are indicative of distance to objects to the rear of the vehicle in order to allow the operator to judge the relative distance to objects behind the equipped vehicle; and*

*wherein said graphic overlay is disabled when the gear actuator of the vehicle is not positioned in a reverse gear.*

Column 3, line 33, Claim 104 should read

*104. A rearview vision system for a vehicle having a gear actuator, said rearview vision system comprising:*

*an image capture device mounted at the rear of the vehicle and having a field of view directed rearwardly of the vehicle;*

*wherein said image capture device comprises a pixelated imaging array, and wherein said pixelated array comprises a CMOS imaging array;*

*a display system viewable by an operator of the vehicle which displays a rearward image output of said image capture device;*

*a graphic overlay superimposed on said rearward image when the operator of the equipped vehicle positions a gear actuator of the vehicle in a reverse gear; and*

*wherein said graphic overlay is disabled when the gear actuator of the vehicle is not positioned in a reverse gear.*

Column 4, line 1, Claim 105 should read

*105. A rearview vision system for a vehicle having a gear actuator, said rearview vision system comprising:*

*an image capture device mounted at the rear of the vehicle and having a field of view directed rearwardly of the vehicle;*

*wherein said image capture device comprises a pixelated image capture device having an array of photosensing elements;*

*circuitry responsive to detection of light by said photosensing elements of said image capture device; a display system viewable by an operator of the vehicle which displays a rearward image output of said image capture device;*

*a graphic overlay superimposed on said rearward image in response to the operator of the equipped vehicle placing the gear selector device in the reverse gear position; and*

*wherein said graphic overlay includes indicia of the anticipated path of travel of the vehicle.*

Column 4, line 24, Claim 106 should read

*106. The rearview vision system of claim 105, wherein said circuitry comprises at least one of a logic circuit, a clock, a random-access-memory, and a digital-to-analog converter.*

Column 4, line 29, Claim 107 should read

*107. The rearview vision system of claim 105, wherein at least a portion of said circuitry and said*

CERTIFICATE OF CORRECTION (continued)  Page 4 of 15
U.S. Pat. No. 6,222,447 C1

*array of photosensing elements are constructed on a common semiconductor substrate.*

Column 4, line 33, Claim 108 should read

*108. The rearview vision system of claim 107, wherein said image capture device comprises a CMOS device.*

Column 4, line 35, Claim 109 should read

*109. The rearview vision system of claim 105, wherein said rearview vision system at least one of (i) extends a dynamic range of said image capture device; (ii) compensates for at least one of a bright spot and a dark spot in the captured image; (iii) utilizes anti-blooming to mitigate the effect of charge leakage from at least one of said photosensing elements to at least an adjacent one of said photosensing elements; (iv) utilizes a multiple exposure technique to highlight dark areas in the captured image; and (v) utilizes at least one of image morphing and warping compensation.*

Column 4, line 45, Claim 110 should read

*110. The rearview vision system of claim 105, wherein said display system displays an image on a video display screen that is viewable by an operator of the vehicle when the operator is looking forward and generally toward the windshield of the vehicle, wherein said video display screen displays in reverse the image captured by said image capture device.*

Column 4, line 52, Claim 111 should read

*111. The rearview vision system of claim 105, wherein said graphic overlay is not superimposed on said rearward image when the operator of the equipped vehicle places the gear selector device in a position other than in the reverse gear position.*

Column 4, line 57, Claim 112 should read

*112. A rearview vision system for a vehicle having a gear selector device, said rearview vision system comprising:*
 *an image capture device mounted at the rear of the vehicle and having a field of view directed rearwardly of the vehicle;*
 *a display system viewable by an operator of the vehicle which displays a rearward image output of said image capture device;*
 *a graphic overlay superimposed on said rearward image in response to the operator of the equipped vehicle placing the gear selector device in the reverse gear position;*
  *wherein said graphic overlay includes indicia of the anticipated path of travel of the vehicle; and*
  *wherein said graphic overlay comprises horizontal grid markings that are indicative of distance to objects to the rear of the vehicle in order to allow the operator to judge the relative distance to objects behind the equipped vehicle.*

Column 5, line 17, Claim 113 should read

*113. The rearview vision system of claim 112, wherein said horizontal grid markings comprise horizontal lines.*

Column 5, line 19, Claim 114 should read

*114. The rearview vision system of claim 112, wherein said horizontal grid markings comprise short horizontal lines.*

Column 5, line 22, Claim 115 should read

*115. The rearview vision system of claim 112, wherein said horizontal grid markings are superimposed on said rearward image at predetermined intervals.*

Column 5, line 25, Claim 116 should read

*116. The rearview vision system of claim 112, wherein said indicia of the anticipated path of travel of the vehicle is responsive to turning of the steering wheel.*

Column 5, line 28, Claim 117 should read

*117. A rearview vision system for a vehicle having a gear selector device, said rearview vision system comprising:*
   *an image capture device mounted at the rear of the vehicle and having a field of view directed rearwardly of the vehicle;*
   *a display system viewable by an operator of the vehicle which displays a rearward image output of said image capture device;*
   *a graphic overlay superimposed on said rearward image in response to the operator of the equipped vehicle placing the gear selector device in the reverse gear position;*
   *wherein said graphic overlay is not superimposed on said rearward image when the operator of the equipped vehicle places the gear selector device in a position other than in the reverse gear position; and*
   *wherein said graphic overlay comprises horizontal grid markings that are indicative of distance to objects to the rear of the vehicle in order to allow the operator to judge the relative distance to objects behind the equipped vehicle.*

Column 5, line 52, Claim 118 should read

*118. The rearview vision system of claim 117, wherein said horizontal grid markings comprise horizontal lines.*

Column 5, line 54, Claim 119 should read

*119. The rearview vision system of claim 117, wherein said horizontal grid markings comprise short*

*horizontal lines.*

Column 5, line 57, Claim 120 should read

*120. The rearview vision system of claim 117, wherein said horizontal grid markings are superimposed on said rearward image at predetermined intervals.*

Column 5, line 60, Claim 121 should read

*121. The rearview vision system of claim 117, wherein said graphic overlay includes indicia of the anticipated path of travel of the vehicle.*

Column 5, line 63, Claim 122 should read

*122. A rearview vision system for a vehicle having a gear selector device, said rearview vision system comprising:*
    *an image capture device mounted at the rear of the vehicle and having a field of view directed rearwardly of the vehicle;*
    *a display system comprising a video display screen that is viewable by an operator of the vehicle and that displays a rearward image output of said image capture device;*
    *a graphic overlay displayed on said video display screen in response to the operator of the equipped vehicle placing the gear selector device in the reverse gear position; and*
    *wherein said graphic overlay is not displayed on said display screen when the operator of the equipped vehicle places the gear selector device in a position other than in the reverse gear position.*

Column 6, line 30, Claim 123 should read

*123. The rearview vision system of claim 122, wherein said graphic overlay includes indicia of the anticipated path of travel of the vehicle.*

Column 6, line 33, Claim 124 should read

*124. The rearview vision system of claim 123, wherein said indicia of the anticipated path of travel of the vehicle is responsive to turning of the steering wheel.*

Column 6, line 36, Claim 125 should read

*125. The rearview vision system of claim 122, wherein said rearview vision system at least one of (i) extends a dynamic range of said image capture device; (ii) compensates for at least one of a bright spot and a dark spot in the captured image; (iii) utilizes anti-blooming to mitigate the effect of charge leakage between adjacent photosensing elements of said image capture device; (iv) utilizes a multiple exposure technique to highlight dark areas in the captured image; and (v) utilizes at least one of image morphing and warping compensation.*

Column 6, line 46, Claim 126 should read

*126. A rearview vision system for a vehicle having a gear selector device, said rearview vision system comprising:*

*an image capture device mounted at the rear of the vehicle and having a field of view directed rearwardly of the vehicle;*

*wherein said image capture device comprises a pixelated image capture device having an array of photosensing elements;*

*circuitry responsive to detection of light by said photosensing elements of said image capture device;*

*a display system comprising a video display screen that is viewable by an operator of the vehicle and that displays a rearward image output of said image capture device;*

*a graphic overlay displayed on said video display screen in response to the operator of the equipped vehicle placing the gear selector device in the reverse gear position;*

*and wherein said graphic overlay is not displayed on said video display screen when the operator of the equipped vehicle places the gear selector device in a position other than in the reverse gear position; and*

*wherein said graphic overlay comprises horizontal grid markings that are indicative of distance to objects to the rear of the vehicle in order to allow the operator to judge the relative distance to objects behind the equipped vehicle.*

Column 7, line 10, Claim 127 should read

*127. The rearview vision system of claim 126, wherein said horizontal grid markings comprise horizontal lines displayed on said video display screen at predetermined intervals.*

Column 7, line 14, Claim 128 should read

*128. The rearview vision system of claim 126, wherein said graphic overlay includes indicia of the anticipated path of travel of the vehicle.*

Column 7, line 17, Claim 129 should read

*129. The rearview vision system of claim 126, wherein at least a portion of said circuitry and said array of photosensing elements are constructed on a common semiconductor substrate.*

Column 7, line 21, Claim 130 should read

*130. The rearview vision system of claim 126, wherein said video display screen is viewable by an operator of the vehicle when the operator is looking forward and generally toward the windshield of the vehicle, wherein said video display screen displays in reverse the image captured by said image capture device.*

Column 7, line 27, Claim 131 should read

*131. The rearview vision system of claim 126, wherein said rearview vision system at least one of (i) extends a dynamic range of said image capture device; (ii) compensates for at least one of a bright spot and a dark spot in the captured image; (iii) utilizes anti-blooming to mitigate the effect of charge leakage from at least one of said photosensing elements to at least an adjacent one of said photosensing elements; (iv) utilizes a multiple exposure technique to highlight dark areas in the captured image; and (v) utilizes at least one of image morphing and warping compensation.*

Column 7, line 37, Claim 132 should read

*132. A rearview vision system for a vehicle having a gear actuator, said rearview vision system comprising:*
   *an image capture device mounted at the rear of the vehicle and having a field of view directed rearwardly of the vehicle;*
   *wherein said image capture device comprises a pixelated image capture device having an array of photosensing elements;*
   *circuitry responsive to detection of light by said photosensing elements of said image capture device; a display system viewable by an operator of the vehicle which displays a rearward image output of said image capture device;*
   *a graphic overlay superimposed on said rearward image in response to the operator of the equipped vehicle placing the gear selector device in the reverse gear position; and*
   *wherein said graphic overlay is not superimposed on said displayed image when the operator of the equipped vehicle places the gear selector device in a position other than in the reverse gear position.*

Column 8, line 8, Claim 133 should read

*133. The rearview vision system of claim 132, wherein said circuitry comprises at least one of a logic circuit, a clock, a random-access-memory, and a digital-to-analog converter.*

Column 8, line 12, Claim 134 should read

*134. The rearview vision system of claim 132, wherein at least a portion of said circuitry and said array of photosensing elements are constructed on a common semiconductor substrate.*

Column 8, line 16, Claim 135 should read

*135. The rearview vision system of claim 132, wherein said image capture device comprises a CMOS device.*

Column 8, line 18, Claim 136 should read

*136. The rearview vision system of claim 132, wherein said display system displays an image on a video display screen that is viewable by an operator of the vehicle when the operator is looking*

*forward and generally toward the windshield of the vehicle, wherein said video display screen displays in reverse the image captured by said image capture device.*

Column 8, line 27, Claim 137 should read

*137. The rearview vision system of claim 132, wherein said rearview vision system at least one of (i) extends a dynamic range of said image capture device; (ii) compensates for at least one of a bright spot and a dark spot in the captured image; (iii) utilizes anti-blooming to mitigate the effect of charge leakage from at least one of said photosensing elements to at least an adjacent one of said photosensing elements; (iv) utilizes a multiple exposure technique to highlight dark areas in the captured image; and (v) utilizes at least one of image morphing and warping compensation.*

Column 8, line 37, Claim 138 should read

*138. A rearview vision system for a vehicle having a gear selector device, said rearview vision system comprising:*
   *an image capture device mounted at the rear of the vehicle and having a field of view directed rearwardly of the vehicle;*
   *wherein said image capture device comprises a pixelated image capture device having an array of photosensing elements;*
   *circuitry responsive to detection of light by said photosensing elements of said image capture device;*
   *wherein at least a portion of said circuitry and said array of photosensing elements are constructed on a common semiconductor substrate;*
   *wherein said rearview vision system at least one of (i) extends a dynamic range of said image capture device; (ii) compensates for at least one of a bright spot and a dark spot in the captured image; (iii) utilizes anti-blooming to mitigate the effect of charge leakage from at least one of said photosensing elements to at least an adjacent one of said photosensing elements; (iv) utilizes a multiple exposure technique to highlight dark areas in the captured image; and (v) utilizes at least one of image morphing and warping compensation;*
   *a display system comprising a video display screen that is viewable by an operator of the vehicle when the operator is looking forward and generally toward the windshield of the vehicle, wherein said video display screen displays in reverse the image captured by said image capture device;*
   *a graphic overlay superimposed on said image in response to the operator of the equipped vehicle placing the gear selector device in the reverse gear position;*
   *wherein said graphic overlay is not superimposed on said rearward image when the operator of the equipped vehicle places the gear selector device in a position other than in the reverse gear position; and*
   *wherein said graphic overlay comprises horizontal grid markings that are indicative of distance to objects to the rear of the vehicle in order to allow the operator to judge the relative distance to objects behind the equipped vehicle.*

Column 9, line 23, Claim 139 should read

*139. The rearview vision system of claim 138, wherein said circuitry comprises at least one of a logic*

*circuit, a clock, a random-access-memory, and a digital-to-analog converter.*

Column 9, line 27, Claim 140 should read

*140. The rearview vision system of claim 138, wherein said image capture device comprises a CMOS device.*

Column 9, line 28, Claim 141 should read

*141. The rearview vision system of claim 138, wherein said horizontal grid markings comprise horizontal lines.*

Column 9, line 30, Claim 142 should read

*142. The rearview vision system of claim 138, wherein said horizontal grid markings comprise short horizontal lines.*

Column 9, line 33, Claim 143 should read

*143. The rearview vision system of claim 138, wherein said horizontal grid markings are displayed on said video display screen at predetermined intervals.*

Column 9, line 36, Claim 144 should read

*144. The rearview vision system of claim 138, wherein said graphic overlay includes indicia of the anticipated path of travel of the vehicle.*

Column 9, line 39, Claim 145 should read

*145. The rearview vision system of claim 144, wherein said indicia of the anticipated path of travel of the vehicle is responsive to turning of the steering wheel.*

Column 9, line 42, Claim 146 should read

*146. A rearview vision system for a vehicle having a gear actuator, said rearview vision system comprising:*
    *an image capture device mounted at the rear of the vehicle and having a field of view directed rearwardly of the vehicle;*
    *wherein said image capture device comprises a pixelated image capture device having an array of photosensing elements;*
    *a display system viewable by an operator of the vehicle which displays a rearward image output of said image capture device;*
    *a graphic overlay superimposed on said rearward image in response to the operator of the equipped vehicle placing the gear selector device in the reverse gear position; and*
    *wherein said graphic overlay is not superimposed on said displayed image when the operator of*

*the equipped vehicle places the gear selector device in a position other than in the reverse gear position.*

Column 10, line 10, Claim 147 should read

*147. The rearview vision system of claim 146 further comprising circuitry responsive to detection of light by said photosensing elements of said image capture device, and wherein at least a portion of said circuitry and said array of photosensing elements are constructed on a common semiconductor substrate.*

Column 10, line 16, Claim 148 should read

*148. The rearview vision system of claim 146, wherein said image capture device comprises a CMOS device.*

Column 10, line 18, Claim 149 should read

*149. A rearview vision system for a vehicle having a gear actuator, said rearview vision system comprising:*
  *an image capture device mounted at the rear of the vehicle and having a field of view directed rearwardly of the vehicle;*
  *a display system viewable by an operator of the vehicle which displays a rearward image output of said image capture device;*
  *a graphic overlay superimposed on said rearward image in response to the operator of the equipped vehicle placing the gear selector device in the reverse gear position;*
  *wherein said graphic overlay is not superimposed on said displayed image when the operator of the equipped vehicle places the gear selector device in a position other than in the reverse gear position; and*
  *wherein said graphic overlay comprises a plurality of horizontal linear marks superimposed on the displayed image.*

Column 10, line 42, Claim 150 should read

*150. The rearview vision system of claim 149, wherein said horizontal linear marks comprise horizontal lines.*

Column 10, line 44, Claim 151 should read

*151. The rearview vision system of claim 149, wherein said horizontal linear marks comprise short horizontal lines.*

Column 10, line 46, Claim 152 should read

*152. The rearview vision system of claim 149, wherein said horizontal linear marks are superimposed on the displayed image at predetermined intervals.*

Column 10, line 49, Claim 153 should read

*153. The rearview vision system of claim 149, wherein said horizontal linear marks are indicative of distance to objects to the rear of the vehicle in order to allow the operator to judge the relative distance to objects behind the equipped vehicle.*

Column 10, line 54, Claim 154 should read

*154. The rearview vision system of claim 149, wherein said graphic overlay is responsive to turning of the steering wheel.*

Column 10, line 57, Claim 155 should read

*155. The rearview vision system of claim 149, wherein said image capture device comprises a pixelated image capture device having an array of photosensing elements.*

Column 10, line 60, Claim 156 should read

*156. A rearview vision system for a vehicle having a gear actuator, said rearview vision system comprising:*
    *an image capture device mounted at the rear of the vehicle and having a field of view directed rearwardly of the vehicle;*
    *a display system comprising a video display screen that is viewable by an operator of the vehicle and that displays a rearward image output of said image capture device;*
    *wherein said video display screen displays an image that is viewable by an operator of the vehicle when the operator is looking forward and generally toward the windshield of the vehicle, wherein said video display screen displays in reverse the image captured by said image capture device;*
    *a graphic overlay superimposed on said rearward image in response to the operator of the equipped vehicle placing the gear selector device in the reverse gear position; and*
    *wherein said graphic overlay is not superimposed on said displayed image when the operator of the equipped vehicle places the gear selector device in a position other than in the reverse gear position.*

Column 11, line 25, Claim 157 should read

*157. The rearview vision system of claim 156, wherein said image capture device comprises a pixelated image capture device having an array of photosensing elements.*

Column 11, line 28, Claim 158 should read

*158. The rearview vision system of claim 157 further comprising circuitry responsive to detection of light by said photosensing elements of said image capture device, and wherein at least a portion of said circuitry and said array of photosensing elements are constructed on a common semiconductor substrate.*

Column 11, line 34, Claim 159 should read

*159. The rearview vision system of claim 157, wherein said image capture device comprises a CMOS device.*

Column 11, line 36, Claim 160 should read

*160. A rearview vision system for a vehicle having a gear actuator, said rearview vision system comprising:*

*an image capture device mounted at the rear of the vehicle and having a field of view directed rearwardly of the vehicle;*

*wherein said image capture device comprises a pixelated image capture device having an array of photosensing elements;*

*a display system viewable by a driver of the vehicle which displays a rearward image output of said image capture device;*

*a graphic overlay superimposed on said rearward image in response to the operator of the equipped vehicle placing the gear selector device in the reverse gear position; and*

*wherein said graphic overlayer includes indicia of the anticipated path of travel of the vehicle.*

Column 12, line 3, Claim 161 should read

*161. The rearview vision system of claim 160, wherein said graphic overlay is not superimposed on said displayed image when the operator of the equipped vehicle places the gear selector device in a position other than in the reverse gear position.*

Column 12, line 8, Claim 162 should read

*162. The rearview vision system of claim 160 further comprising circuitry responsive to detection of light by said photosensing elements of said image capture device, and wherein at least a portion of said circuitry and said array of photosensing elements are constructed on a common semiconductor substrate.*

Column 12, line 14, Claim 163 should read

*163. The rearview vision system of claim 160, wherein said image capture device comprises a CMOS device.*

Column 12, line 16, Claim 164 should read

*164. A rearview vision system for a vehicle having a gear actuator, said rearview vision system comprising:*

*an image capture device mounted at the rear of the vehicle and having a field of view directed rearwardly of the vehicle;*

*a display system viewable by a driver of the vehicle which displays a rearward image output of said image capture device;*

*a graphic overlay superimposed on said rearward image in response to the operator of the equipped vehicle placing the gear selector device in the reverse gear position;*

*wherein said graphic overlayer includes indicia of the anticipated path of travel of the vehicle; and*

*wherein said graphic overlay comprises a plurality of horizontal linear marks superimposed on the displayed image.*

Column 12, line 41, Claim 165 should read

*165. The rearview vision system of claim 164, wherein said horizontal linear marks comprise horizontal lines.*

Column 12, line 43, Claim 166 should read

*166. The rearview vision system of claim 164, wherein said horizontal linear marks are superimposed on the displayed image at predetermined intervals.*

Column 12, line 46, Claim 167 should read

*167. The rearview vision system of claim 164, wherein said graphic overlay is responsive to turning of the steering wheel.*

Column 12, line 49, Claim 168 should read

*168. The rearview vision system of claim 164, wherein said horizontal linear marks are indicative of distance to objects to the rear of the vehicle in order to allow the operator to judge the relative distance to objects behind the equipped vehicle.*

Column 12, line 54, Claim 169 should read

*169. A rearview vision system for a vehicle having a gear actuator, said rearview vision system comprising:*

*an image capture device mounted at the rear of the vehicle and having a field of view directed rearwardly of the vehicle;*

*a display system comprising a video display screen that is viewable by an operator of the vehicle and that displays a rearward image output of said image capture device;*

*wherein said video display screen displays an image that is viewable by an operator of the vehicle when the operator is looking forward and generally toward the windshield of the vehicle, wherein said video display screen displays in reverse the image captured by said image capture device;*

*a graphic overlay superimposed on said rearward image in response to the operator of the equipped vehicle placing the gear selector device in the reverse gear position; and*

*wherein said graphic overlayer includes indicia of the anticipated path of travel of the vehicle.*

CERTIFICATE OF CORRECTION (continued)

Column 14, line 3, Claim 170 should read

*170. The rearview vision system of claim 169, wherein said graphic overlay is not superimposed on said displayed image when the operator of the equipped vehicle places the gear selector device in a position other than in the reverse gear position.*

Column 14, line 7, Claim 171 should read

*171. The rearview vision system of claim 169, wherein said image capture device comprises a pixelated image capture device having an array of photosensing elements.*

Column 14, line 10, Claim 172 should read

*172. The rearview vision system of claim 169, wherein said indicia of the anticipated path of travel of the vehicle is responsive to turning of the steering wheel of the vehicle.*

(12) EX PARTE REEXAMINATION CERTIFICATE (8089th)
United States Patent
Schofield et al.

(10) Number: US 6,222,447 C1
(45) Certificate Issued: Mar. 15, 2011

(54) REARVIEW VISION SYSTEM WITH INDICIA OF BACKUP TRAVEL

(75) Inventors: Kenneth Schofield, Holland, MI (US); Mark L. Larson, Grand Haven, MI (US); Keith J. Vadas, Coopersville, MI (US)

(73) Assignee: Donnelly Corporation, Holland, MI (US)

Reexamination Request:
No. 90/007,519, Apr. 22, 2005

Reexamination Certificate for:
Patent No.: 6,222,447
Issued: Apr. 24, 2001
Appl. No.: 09/313,139
Filed: May 17, 1999

Related U.S. Application Data

(63) Continuation of application No. 08/935,336, filed on Sep. 22, 1997, now Pat. No. 5,949,331, which is a continuation of application No. 08/445,527, filed on May 22, 1995, now Pat. No. 5,670,935, which is a continuation-in-part of application No. 08/023,918, filed on Feb. 26, 1993, now Pat. No. 5,550,677.

(51) Int. Cl.
*B60S 1/08* (2006.01)
*H04N 7/18* (2006.01)
*B60N 2/00* (2006.01)
*B60R 1/00* (2006.01)
*B60R 11/04* (2006.01)
*B60R 11/00* (2006.01)
*B60R 1/08* (2006.01)
*B60Q 1/04* (2006.01)
*B60Q 1/14* (2006.01)
*B60Q 1/50* (2006.01)
*B60Q 1/52* (2006.01)
*B60Q 1/08* (2006.01)
*B60R 21/01* (2006.01)
*B60R 1/12* (2006.01)

(52) U.S. Cl. .............. 340/461; 340/435; 340/436; 340/901; 340/903; 345/7; 345/9; 348/148; 348/E7.086; 701/300; 701/301

(58) Field of Classification Search .................. None
See application file for complete search history.

(56) References Cited

FOREIGN PATENT DOCUMENTS

| JP | 59-114139 A | 7/1984 |
|----|----|----|
| JP | 64-14700 A | 1/1989 |
| JP | 05-50883 A | 3/1993 |
| JP | 05-77657 A | 3/1993 |
| JP | 07-4170 | 1/1995 |
| JP | 07-105496 A | 4/1995 |
| JP | 2630604 B2 | 4/1997 |

OTHER PUBLICATIONS

Futamura et al., Japanese Kokai Patent Publication No. S64–14700, published Jan. 18, 1989, USPTO STIC English Language Translation, PTO 2009–4271.*

* cited by examiner

*Primary Examiner*—Roland G Foster

(57) ABSTRACT

A rearview vision system for a vehicle includes an image capture device mounted at the rear of the vehicle and having a field of view directed rearwardly of the vehicle. A display system is viewable by a driver of the vehicle. The display system displays a rearward image output of the image capture device. A graphic overlay is superimposed on the rearward image when the gear actuator of the vehicle selects a reverse gear. The graphic overlay may include indicia of the anticipated path of travel of the vehicle. The graphic overlay may be disabled when the gear actuator of the vehicle is not in reverse gear.

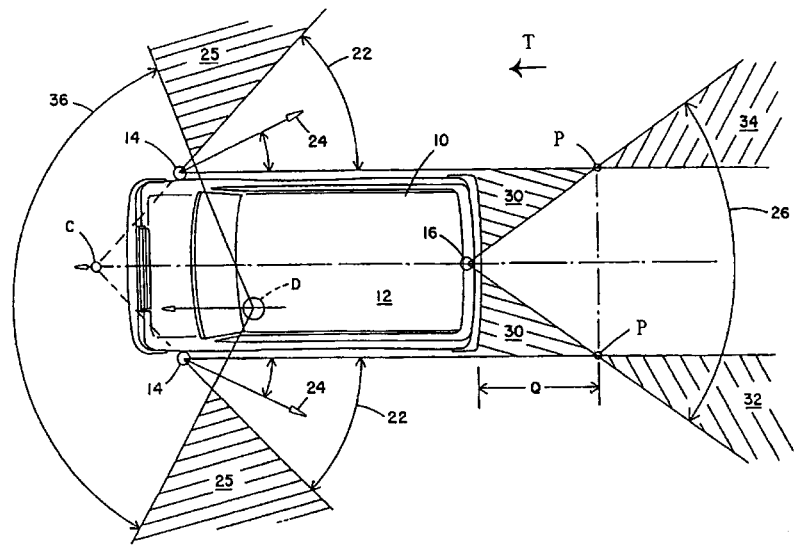

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 32-35, 37-43 and 46-101 is confirmed.

Claims 1-3 and 5-31 are cancelled.

Claims 4, 36, 44 and 45 are determined to be patentable as amended.

New claims 102-172 are added and determined to be patentable.

4. [The] *A* rearview *vision* system [of claim 1] *for a vehicle having a gear actuator, comprising:*
   *an image capture device mounted at the rear of the vehicle and having a field of view directed rearwardly of the vehicle;*
   *a display system viewable by a driver the vehicle which displays a rearward image output of said image capture device;*
   *the gear actuator being a gear selector device operable by the driver of the vehicle to select a reverse gear position and to not select a reverse gear position;*
   *a graphic overlayer superimposed on said rearward image when the driver of the vehicle, when the equipped vehicle is not traveling in reverse, operates the gear actuator of the vehicle to select the reverse gear position;*
   wherein said graphic overlayer includes indicia of the anticipated path of travel of the vehicle; *and*
   wherein said graphic overlayer is not superimposed on said rearward image when the gear actuator of the vehicle does not select [a] *the* reverse gear *position*.

36. [The] *A* rearview *vision* system [of claim 33] *for a vehicle having a gear actuator, comprising:*
    *an image capture device mounted at the rear of the vehicle and having a field of view directed rearwardly of the vehicle;*
    *a display system viewable by a driver of the vehicle which displays a rearward image output of said image capture device;*
    *the gear actuator being a gear selector device operable by the driver of the vehicle to select a reverse gear position and to not select a reverse gear position;*
    *a graphic overlayer superimposed on said rearward image when the driver of the vehicle, when the equipped vehicle is not traveling in reverse, operates the gear actuator of the vehicle to select the reverse gear position;*
    *wherein said graphic overlayer is disabled when the gear actuator of the vehicle is not in the reverse gear position; and*
    wherein said graphic overlayer includes indicia of the anticipated path of travel of the vehicle *and* wherein said indicia comprise *linear* markings that provide indication of distance behind the vehicle.

44. The rearview system of claim 32 wherein said image capture device comprises a [pixilated] *pixelated* imaging array.

45. [The] *A* rearview *vision* system [of claim 44] *for a vehicle having a gear actuator, comprising:*
    *an image capture device mounted at the rear of the vehicle and having a field of view directed rearwardly of the vehicle, wherein said image capture device comprises a pixelated imaging array and* wherein said [pixilated] *pixelated* array comprises a CMOS imaging array;
    *a display system viewable by a driver of the vehicle which displays a rearward image output of said image capture device;*
    *wherein said display system displays the rearward image output on a video display screen that is viewable by the driver of the vehicle when the driver is looking forward and generally toward the windshield of the vehicle, and wherein said video display screen displays in reverse the image captured by said image capture device so that the driver, when looking forward and observing a displayed image of a rearward scene displayed by said video display screen, will interpret the displayed image as if it were a reflection of the scene in a vehicular mirror;*
    *the gear actuator being a gear selector device operable by the driver of the vehicle to select a reverse gear position and to not select a reverse gear position;*
    *a graphic overlayer superimposed on said rearward image when the driver of the vehicle, when the equipped vehicle is not traveling in reverse, operates the gear actuator of the vehicle to select the reverse gear position; and*
    *wherein said graphic overlayer is disabled when the gear actuator of the vehicle is not in the reverse gear position.*

*102. A rearview vision system for a vehicle having a gear actuator, said rearview vision system comprising:*
   *an image capture device mounted at the rear of the vehicle and having a field of view directed rearwardly of the vehicle;*
   *a display system viewable by an operator of the vehicle which displays a rearward image output of said image capture device;*
   *wherein said display system displays the rearward image output on a video display screen that is viewable by the driver of the vehicle when the driver is looking forward and generally toward the windshield of the vehicle, and wherein said video display screen displays in reverse the image captured by said image capture device so that the operator, when looking forward and observing a displayed image of a rearward scene displayed by said video display screen, will interpret the displayed image as if it were a reflection of the scene in a vehicular mirror;*
   *the gear actuator being a gear selector device operable by an operator of the vehicle to select a reverse gear position and to not select a reverse gear position;*
   *a graphic overlay superimposed on said rearward image when the operator of the equipped vehicle, when the equipped vehicle is not traveling in reverse, positions the gear actuator of the vehicle in the reverse gear position;* wherein said graphic overlay is not superimposed on said rearward image when the gear actuator of the vehicle is not positioned in the reverse gear position; and wherein said graphic overlay includes indicia of the anticipated path of travel of the vehicle.

103. A rearview vision system for a vehicle having a gear actuator, said rearview vision system comprising:

an image capture device mounted at the rear of the vehicle and having a field of view directed rearwardly of the vehicle;

a display system viewable by an operator of the vehicle which displays a rearward image output of said image capture device;

the gear actuator being a gear selector device operable by an operator of the vehicle to select a reverse gear position and to not select a reverse gear position;

a graphic overlay superimposed on said rearward image when the operator of the equipped vehicle, when the equipped vehicle is not traveling in reverse, positions the gear actuator of the vehicle in the reverse gear position;

wherein said graphic overlay includes indicia of the anticipated path of travel of the vehicle, and wherein said indicia comprise horizontal linear markings that are indicative of distance to objects to the rear of the vehicle in order to allow the operator to judge the relative distance to objects behind the equipped vehicle; and wherein said graphic overlay is disabled when the gear actuator of the vehicle is not positioned in the reverse gear position.

104. A rearview vision system for a vehicle having a gear actuator, said rearview vision system comprising:

an image capture device mounted at the rear of the vehicle and having a field of view directed rearwardly of the vehicle;

wherein said image capture device comprises a pixelated imaging array, and wherein said pixelated array comprises a CMOS imaging array;

a display system viewable by an operator of the vehicle which displays a rearward image output of said image capture device;

wherein said display system displays the rearward image output on a video display screen that is viewable by the driver of the vehicle when the driver is looking forward and generally toward the windshield of the vehicle, and wherein said video display screen displays in reverse the image captured by said image capture device so that the operator, when looking forward and observing a displayed image of a rearward scene displayed by said video display screen, will interpret the displayed image as if it were a reflection of the scene in a vehicular mirror, and wherein said reversal is effected at said image capture device;

the gear actuator being a gear selector device operable by an operator of the vehicle to select a reverse gear position and to not select a reverse gear position;

a graphic overlay superimposed on said rearward image when the operator of the equipped vehicle, when the equipped vehicle is not traveling in reverse, positions the gear actuator of the vehicle in the reverse gear position; and wherein said graphic overlay is disabled when the gear actuator of the vehicle is not positioned in the reverse gear position.

105. A rearview vision system for a vehicle having a gear actuator, said rearview vision system comprising:

an image capture device mounted at the rear of the vehicle and having a field of view directed rearwardly of the vehicle;

wherein said image capture device comprises a pixelated image capture device having an array of photosensing elements;

circuitry responsive to detection of light by said photosensing elements of said image capture device;

a display system viewable by an operator of the vehicle which displays a rearward image output of said image capture device;

the gear actuator being a gear selector device operable by an operator of the vehicle to select a reverse gear position and to not select a reverse gear position;

a graphic overlay superimposed on said rearward image in response to the operator of the equipped vehicle, when the equipped vehicle is not traveling in reverse, placing the gear selector device in the reverse gear position; and wherein said graphic overlay includes indicia of the anticipated path of travel of the vehicle.

106. The rearview vision system of claim 105, wherein said circuitry comprises at least one of a logic circuit, a clock, a random-access-memory, and a digital-to-analog converter.

107. The rearview vision system of claim 105, wherein at least a portion of said circuitry and said array of photosensing elements are constructed on a common semiconductor substrate.

108. The rearview vision system of claim 107, wherein said image capture device comprises a CMOS device.

109. The rearview vision system of claim 105, wherein said rearview vision system at least one of (i) extends a dynamic range of said image capture device; (ii) compensates for at least one of a bright spot and a dark spot in the captured image; (iii) utilizes anti-blooming to mitigate the effect of charge leakage from at least one of said photosensing elements to at least an adjacent one of said photosensing elements; (iv) utilizes a multiple exposure technique to highlight dark areas in the captured image; and (v) utilizes at least one of image morphing and warping compensation.

110. The rearview vision system of claim 105, wherein said display system displays an image on a video display screen that is viewable by an operator of the vehicle when the operator is looking forward and generally toward the windshield of the vehicle, wherein said video display screen displays in reverse the image captured by said image capture device.

111. The rearview vision system of claim 105, wherein said graphic overlay is not superimposed on said rearward image when the operator of the equipped vehicle places the gear selector device in a position other than in the reverse gear position.

112. A rearview vision system for a vehicle having a gear selector device, said rearview vision system comprising:

an image capture device mounted at the rear of the vehicle and having a field of view directed rearwardly of the vehicle;

a display system viewable by an operator of the vehicle which displays a rearward image output of said image capture device;

the gear selector device operable by an operator of the vehicle to select a reverse gear position and to not select a reverse gear position;

a graphic overlay superimposed on said rearward image in response to the operator of the equipped vehicle, when the equipped vehicle is not traveling in reverse, placing the rear selector device in the reverse gear position;

wherein said graphic overlay includes indicia of the anticipated path of travel of the vehicle; and wherein said graphic overlay comprises horizontal linear grid markings that are indicative of distance to objects to the rear of the vehicle in order to allow the operator to judge the relative distance to objects behind the equipped vehicle, and wherein said horizontal linear grid markings extend horizontally at least partially across the displayed image and are sized to be perceptible to the operator of the vehicle when the operator is operating the vehicle and viewing the displayed image.

113. The rearview vision system of claim 112, wherein said horizontal grid markings comprise horizontal lines.

114. The rearview vision system of claim 112, wherein said horizontal grid markings comprise short horizontal lines.

115. The rearview vision system of claim 112, wherein said horizontal grid markings are superimposed on said rearward image at predetermined intervals.

116. The rearview vision system of claim 112, wherein said indicia of the anticipated path of travel of the vehicle is responsive to turning of the steering wheel.

117. A rearview vision system for a vehicle having a gear selector device, said rearview vision system comprising:

an image capture device mounted at the rear of the vehicle and having a field of view directed rearwardly of the vehicle;

a display system viewable by an operator of the vehicle which displays a rearward image output of said image capture device;

the gear selector device operable by an operator of the vehicle to select a reverse gear position and to not select a reverse gear position;

a graphic overlay superimposed on said rearward image in response to the operator of the equipped vehicle, when the equipped vehicle is not traveling in reverse, placing the rear selector device in the reverse gear position;

wherein said graphic overlay is not superimposed on said rearward image when the operator of the equipped vehicle places the gear selector device in a position other than in the reverse gear position; and wherein said graphic overlay comprises horizontal linear grid markings that are indicative of distance to objects to the rear of the vehicle in order to allow the operator to judge the relative distance to objects behind the equipped vehicle.

118. The rearview vision system of claim 117, wherein said horizontal grid markings comprise horizontal lines.

119. The rearview vision system of claim 117, wherein said horizontal grid markings comprise short horizontal lines.

120. The rearview vision system of claim 117, wherein said horizontal grid markings are superimposed on said rearward image at predetermined intervals.

121. The rearview vision system of claim 117, wherein said graphic overlay includes indicia of the anticipated path of travel of the vehicle.

122. A rearview vision system for a vehicle having a gear selector device, said rearview vision system comprising:

an image capture device mounted at the rear of the vehicle and having a field of view directed rearwardly of the vehicle;

a display system comprising a video display screen that is viewable by an operator of the vehicle and that displays a rearward image output of said image capture device;

wherein said display system displays the rearward image output on a video display screen that is viewable by the driver of the vehicle when the driver is looking forward and generally toward the windshield of the vehicle, and wherein said video display screen displays in reverse the image captured by said image capture device so that the operator, when looking forward and observing a displayed image of a rearward scene displayed by said video display screen, will interpret the displayed image as if it were a reflection of the scene in a vehicular mirror, and wherein said reversal is effected at at least one of said image capture device and said video display screen;

the gear selector device being operable by an operator of the vehicle to select a reverse gear position and to not select a reverse gear position;

a graphic overlay displayed on said video display screen in response to the operator of the equipped vehicle, when the equipped vehicle is not traveling in reverse, placing the gear selector device in the reverse gear position; and wherein said graphic overlay is not displayed on said display screen when the operator of the equipped vehicle places the gear selector device in a position other than in the reverse gear position.

123. The rearview vision system of claim 122, wherein said graphic overlay includes indicia of the anticipated path of travel of the vehicle.

124. The rearview vision system of claim 123, wherein said indicia of the anticipated path of travel of the vehicle is responsive to turning of the steering wheel.

125. The rearview vision system of claim 122, wherein said rearview vision system at least one of (i) extends a dynamic range of said image capture device; (ii) compensates for at least one of a bright spot and a dark spot in the captured image; (iii) utilizes anti-blooming to mitigate the effect of charge leakage between adjacent photosensing elements of said image capture device; (iv) utilizes a multiple exposure technique to highlight dark areas in the captured image; and (v) utilizes at least one of image morphing and warping compensation.

126. A rearview vision system for a vehicle having a gear selector device, said rearview vision system comprising:

an image capture device mounted at the rear of the vehicle and having a field of view directed rearwardly of the vehicle;

wherein said image capture device comprises a pixelated image capture device having an array of photosensing elements;

circuitry responsive to detection of light by said photosensing elements of said image capture device;

a display system comprising a video display screen that is viewable by an operator of the vehicle and that displays a rearward image output of said image capture device;

the gear selector device being operable by an operator of the vehicle to select a reverse gear position and to not select a reverse gear position;

a graphic overlay displayed on said video display screen in response to the operator of the equipped vehicle, when the equipped vehicle is not traveling in reverse, placing the gear selector device in the reverse gear position;

and wherein said graphic overlay is not displayed on said video display screen when the operator of the equipped vehicle places the gear selector device in a position other than in the reverse gear position; and wherein said graphic overlay comprises horizontal linear grid markings that are indicative of distance to objects to the rear of the vehicle in order to allow the operator to judge the relative distance to objects behind the equipped vehicle.

127. The rearview vision system of claim 126, wherein said horizontal grid markings comprise horizontal lines displayed on said video display screen at predetermined intervals.

128. The rearview vision system of claim 126, wherein said graphic overlay includes indicia of the anticipated path of travel of the vehicle.

129. The rearview vision system of claim 126, wherein at least a portion of said circuitry and said array of photosensing elements are constructed on a common semiconductor substrate.

130. The rearview vision system of claim 126, wherein said video display screen is viewable by an operator of the vehicle when the operator is looking forward and generally toward the windshield of the vehicle, wherein said video display screen displays in reverse the image captured by said image capture device.

131. The rearview vision system of claim 126, wherein said rearview vision system at least one of (i) extends a dynamic range of said image capture device; (ii) compensates for at least one of a bright spot and a dark spot in the captured image; (iii) utilizes anti-blooming to mitigate the effect of charge leakage from at least one of said photosensing elements to at least an adjacent one of said photosensing elements; (iv) utilizes a multiple exposure technique to highlight dark areas in the captured image; and (v) utilizes at least one of image morphing and warping compensation.

132. A rearview vision system for a vehicle having a gear actuator, said rearview vision system comprising:

an image capture device mounted at the rear of the vehicle and having a field of view directed rearwardly of the vehicle;

wherein said image capture device comprises a pixelated image capture device having an array of photosensing elements;

circuitry responsive to detection of light by said photosensing elements of said image capture device;

a display system viewable by an operator of the vehicle which displays a rearward image output of said image capture device;

wherein said display system displays the rearward image output on a video display screen that is viewable by the driver of the vehicle when the driver is looking forward and generally toward the windshield of the vehicle, and wherein said video display screen displays in reverse the image captured by said image capture device so that the operator, when looking forward and observing a displayed image of a rearward scene displayed by said video display screen, will interpret the displayed image as if it were a reflection of the scene in a vehicular mirror, and wherein said reversal is effected at said image capture device;

the gear actuator being a gear selector device operable by an operator of the vehicle to select a reverse gear position and to not select a reverse gear position;

a graphic overlay superimposed on said rearward image in response to the operator of the equipped vehicle, when the equipped vehicle is not travelling in reverse, placing the gear selector device in the reverse gear position; and wherein said graphic overlay is not superimposed on said displayed image when the operator of the equipped vehicle places the gear selector device in a position other than in the reverse gear position.

133. The rearview vision system of claim 132, wherein said circuitry comprises at least one of a logic circuit, a clock, a random-access-memory, and a digital-to-analog converter.

134. The rearview vision system of claim 132, wherein at least a portion of said circuitry and said array of photosensing elements are constructed on a common semiconductor substrate.

135. The rearview vision system of claim 132, wherein said image capture device comprises a CMOS device.

136. The rearview vision system of claim 132, wherein said image capture device utilizes a wide angle optical system comprising non-symmetrical optics in order to provide a wide angle view of an area rearwards of the vehicle, said wide angle optical system being adapted to capture an image that is at least partially non-distorted, wherein said wide angle optical system comprises utilization of a non-symmetrical optic in order to capture said at least partially non-distorted image.

137. The rearview vision system of claim 132, wherein said rearview vision system at least one of (i) extends a dynamic range of said image capture device; (ii) compensates for at least one of a bright spot and a dark spot in the captured image; (iii) utilizes anti-blooming to mitigate the effect of charge leakage from at least one of said photosensing elements to at least an adjacent one of said photosensing elements; (iv) utilizes a multiple exposure technique to highlight dark areas in the captured image; and (v) utilizes at least one of image morphing and warping compensation.

138. A rearview vision system for a vehicle having a gear selector device, said rearview vision system comprising:

an image capture device mounted at the rear of the vehicle and having a field of view directed rearwardly of the vehicle;

wherein said image capture device comprises a pixelated image capture device having an array of photosensing elements;

ciruitry responsive to detection of light by said photosensing elements of said image capture device;

wherein at least a portion of said circuitry and said array of photosensing elements are constructed on a common semiconductor substrate;

wherein said rearview vision system at least one of (i) extends a dynamic range of said image capture device; (ii) compensates for at least one of a bright spot and a dark spot in the captured image; (iii) utilizes anti-blooming to mitigate the effect of charge leakage from at least one of said photosensing elements to at least an adjacent one of said photosensing elements; (iv) utilizes a multiple exposure technique to highlight dark areas in the captured image; and (v) utilizes at least one of image morphing and warping compensation;

a display system comprising a video display screen that is viewable by an operator of the vehicle when the operator is looking forward and generally toward the windshield of the vehicle, wherein said video display screen displays in reverse the image captured by said image capture device so that the operator, when looking forward and observing a displayed image of a rearward scene displayed by said video display screen, will interpret the displayed image as if it were a reflection of the scene in a vehicular mirror, and wherein said reversal is effected at one of said image capture device and said video display screen;

the gear selector device operable by an operator of the vehicle to select a reverse gear position and to not select a reverse gear position;

a graphic overlay superimposed on said rearward image in response to the operator of the equipped vehicle, when the equipped vehicle is not traveling in reverse, placing the gear selector device in the reverse gear position;

wherein said graphic overlay is not superimposed on said rearward image when the operator of the equipped vehicle places the gear selector device in a position other than in the reverse gear position; and wherein said graphic overlay comprises horizontal grid markings that are indicative of distance to objects to the rear of the vehicle in order to allow the operator to judge the relative distance to objects behind the equipped vehicle.

139. The rearview vision system of claim 138, wherein said circuitry comprises at least one of a logic circuit, a clock, a random-access-memory, and a digital-to-analog converter.

140. The rearview vision system of claim 138, wherein said image capture device comprises a CMOS device.

141. The rearview vision system of claim 138, wherein said horizontal grid markings comprise horizontal lines.

142. The rearview vision system of claim 138, wherein said horizontal grid markings comprise short horizontal lines.

143. The rearview vision system of claim 138, wherein said horizontal grid markings are displayed on said video display screen at predetermined intervals.

144. The rearview vision system of claim 138, wherein said graphic overlay includes indicia of the anticipated path of travel of the vehicle.

145. The rearview vision system of claim 138, wherein said indicia of the anticipated path of travel of the vehicle is responsive to turning of the steering wheel.

146. A rearview vision system for a vehicle having a gear selector device, said rearview vision system comprising:

an image capture device mounted at the rear of the vehicle and having a field of view directed rearwardly of the vehicle;

wherein said image capture device comprises a pixelated image capture device having an array of photosensing elements;

a display system a viewable by an operator of the vehicle which displays a rearward image output of said image capture device;

wherein said display system displays the rearward image output on a video display screen that is viewable by the driver of the vehicle when the driver is looking forward and generally toward the windshield of the vehicle, and wherein said video display screen displays in reverse the image captured by said image capture device so that the operator, when looking forward and observing a displayed image of a rearward scene displayed by said video display screen, will interpret the displayed image as if it were a reflection of the scene in a vehicular mirror, and wherein said reversal is effected at said image capture device;

the gear actuator being a gear selector device operable by an operator of the vehicle to select a reverse gear position and to not select a reverse gear position;

a graphic overlay superimposed on said rearward image in response to the operator of the equipped vehicle, when the equipped vehicle is not traveling in reverse, placing the gear selector device in the reverse gear position; and wherein said graphic overlay is not superimposed on said rearward image when the operator of the equipped vehicle places the gear selector device in a position other than in the reverse gear position.

147. The rearview vision system of claim 146 further comprising circuitry responsive to detection of light by said photosensing elements of said image capture device, and wherein at least a portion of said circuitry and said array of photosensing elements are constructed on a common semiconductor substrate.

148. The rearview vision system of claim 146, wherein said image capture device comprises a CMOS device.

149. A rearview vision system for a vehicle having a gear actuator, said rearview vision system comprising:

an image capture device mounted at the rear of the vehicle and having a field of view directed rearwardly of the vehicle;

a display system viewable by an operator of the vehicle which displays a rearward image output of said image capture device;

the gear actuator being a gear selector device operable by an operator of the vehicle to select a reverse gear position and to not select a reverse gear position;

a graphic overlay superimposed on said rearward image in response to the operator of the equipped vehicle, when the equipped vehicle is not traveling in reverse, placing the gear selector device in the reverse gear position;

wherein said graphic overlay is not superimposed on said rearward image when the operator of the equipped vehicle places the gear selector device in a position other than in the reverse gear position; and wherein said graphic overlay comprises a plurality of horizontal linear marks superimposed on the displayed image.

150. The rearview vision system of claim 149, wherein said horizontal linear marks comprise horizontal lines.

151. The rearview vision system of claim 149, wherein said horizontal linear marks comprise short horizontal lines.

152. The rearview vision system of claim 149, wherein said horizontal linear marks are superimposed on the displayed image at predetermined intervals.

153. The rearview vision system of claim 149, wherein said horizontal linear marks are indicative of distance to objects to the rear of the vehicle in order to allow the operator to judge the relative distance to objects behind the equipped vehicle.

154. The rearview vision system of claim 149, wherein said graphic overlay is responsive to turning of the steering wheel.

155. The rearview vision system of claim 149, wherein said image capture device comprises a pixelated image capture device having an array of photosensing elements.

156. A rearview vision system for a vehicle having a gear actuator, said rearview vision system comprising:

an image capture device mounted at the rear of the vehicle and having a field of view directed rearwardly of the vehicle;

a display system comprising a video display screen that is viewable by an operator of the vehicle and that displays a rearward image output of said image capture device;

wherein said video display screen displays an image that is viewable by an operator of the vehicle when the operator is looking forward and generally toward the windshield of the vehicle, wherein said video display screen displays in reverse the image captured by said image capture device so that the operator, when looking forward and observing a displayed image of a rearward scene displayed by said video display screen, will interpret the displayed image as if it were a reflection of the scene in a vehicular mirror, and wherein said reversal is effected at one of said image capture device and said video display screen;

the gear actuator being a gear selector device operable by an operator of the vehicle to select a reverse gear position and to not select a reverse gear position;

a graphic overlay superimposed on said rearward image in response to the operator of the equipped vehicle, when the equipped vehicle is not traveling in reverse, placing the gear selector device in the reverse gear position; and wherein said graphic overlay is not superimposed on said rearward image when the operator of the equipped vehicle places the gear selector device in a position other than in the reverse gear position.

157. The rearview vision system of claim 156, wherein said image capture device comprises a pixelated image capture device having an array of photosensing elements.

158. The rearview vision system of claim 157 further comprising circuitry responsive to detection of light by said photosensing elements of said image capture device, and wherein at least a portion of said circuitry and said array of photosensing elements are constructed on a common semiconductor substrate.

159. The rearview vision system of claim 157, wherein said image capture device comprises a CMOS device.

160. A rearview vision system for a vehicle having a gear actuator, said rearview vision system comprising:

an image capture device mounted at the rear of the vehicle and having a field of view directed rearwardly of the vehicle;

wherein said image capture device comprises a pixelated image capture device having an array of photosensing elements;

a display system viewable by an operator of the vehicle which displays a rearward image output of said image capture device;

wherein said display system displays the rearward image output on a video display screen that is viewable by the driver of the vehicle when the driver is looking foward and generally toward the windshield of the vehicle, and wherein said video display screen displays in reverse the image captured by said image capture device so that the operator, when looking forward and observing a displayed image of a rearward scene displayed by said video display screen, will interpret the displayed image as if it were a reflection of the scene in a vehicular mirror, and wherein said reversal is effected at said image capture device;

the gear actuator being a gear selector device operable by an operator of the vehicle to select a reverse gear position and to not select a reverse gear position;

a graphic overlay superimposed on said rearward image in response to the operator of the equipped vehicle, when the equipped vehicle is not traveling in reverse, placing the gear selector device in the reverse gear position; and wherein said graphic overlay includes indicia of the anticipated path of travel of the vehicle.

161. The rearview vision system of claim 160, wherein said graphic overlay is not superimposed on said displayed image when the operator of the equipped vehicle places the gear selector device in a position other than in the reverse gear position.

162. The rearview vision system of claim 160 further comprising circuitry responsive to detection of light by said photosensing elements of said image capture device, and wherein at least a portion of said circuitry and said array of photosensing elements are constructed on a common semiconductor substrate.

163. The rearview vision system of claim 160, wherein said image capture device comprises a CMOS device.

164. A rearview vision system for a vehicle having a gear actuator, said rearview vision system comprising:

an image capture device mounted at the rear of the vehicle and having a field of view directed rearwardly of the vehicle;

a display system viewable by an operator of the vehicle which displays a rearward image output of said image capture device;

the gear actuator being a gear selector device operable by an operator of the vehicle to select a reverse gear position and to not select a reverse gear position;

a graphic overlay superimposed on said rearward image in response to the operator of the equipped vehicle, when the equipped vehicle is not traveling in reverse, placing the gear selector device in the reverse gear position; and wherein said graphic overlay includes indicia of the anticipated path of travel of the vehicle; and wherein said graphic overlay comprises a plurality of horizontal linear marks superimposed on the displayed image, and wherein said plurality of horizontal linear marks comprise at least one pair of spaced apart horizontal linear marks that are spaced laterally apart on the displayed image.

165. The rearview vision system of claim 164, wherein said horizontal linear marks comprise horizontal lines.

166. The rearview vision system of claim 164, wherein said horizontal linear marks are superimposed on the displayed image at predetermined intervals.

167. The rearview vision system of claim 164, wherein said graphic overlay is responsive to turning of the steering wheel.

168. The rearview vision system of claim 164, wherein said horizontal linear marks are indicative of distance to objects to the rear of the vehicle in order to allow the operator to judge the relative distance to objects behind the equipped vehicle.

169. A rearview vision system for a vehicle having a gear selector device, said rearview vision system comprising:

an image capture device mounted at the rear of the vehicle and having a field of view directed rearwardly of the vehicle;

a display system comprising a video display screen that is viewable by an operator of the vehicle and that displays a rearward image output of said image capture device;

wherein said video display screen displays an image that is viewable by an operator of the vehicle when the operator is looking forward and generally toward the windshield of the vehicle;

wherein said video display screen displays in reverse the image captured by said image capture device so that the operator, when looking forward and observing a displayed image of a rearward scene displayed by said video display screen, will interpret the displayed image as if it were a reflection of the scene in a vehicular mirror, and wherein said reversal is effected at said image capture device;

the gear selector device operable by an operator of the vehicle to select a reverse gear position and to not select a reverse gear position;

a graphic overlay superimposed on said rearward image in response to the operator of the equipped vehicle, when the equipped vehicle is not traveling in reverse, placing the gear selector device in the reverse gear position; and wherein said graphic overlay includes indicia of the anticipated path of travel of the vehicle.

170. The rearview vision system of claim 169, wherein said graphic overlay is not superimposed on said displayed image when the operator of the equipped vehicle places the gear selector device in a position other than in the reverse gear position.

171. The rearview vision system of claim 169, wherein said image capture device comprises a pixelated image capture device having an array of photosensing elements.

172. The rearview vision system of claim 169, wherein said indicia of the anticipated path of travel of the vehicle is responsive to turning of the steering wheel of the vehicle.

\* \* \* \* \*

US006222447C2

(12) EX PARTE REEXAMINATION CERTIFICATE (10735th)
United States Patent
Schofield et al.

(10) Number: US 6,222,447 C2
(45) Certificate Issued: *Oct. 9, 2015

(54) REARVIEW VISION SYSTEM WITH INDICIA OF BACKUP TRAVEL

(76) Inventors: Kenneth Schofield, Holland, MI (US); Mark L. Larson, Grand Haven, MI (US); Keith J. Vadas, Coopersville, MI (US)

Reexamination Request:
No. 90/011,478, Feb. 7, 2011

Reexamination Certificate for:
Patent No.: 6,222,447
Issued: Apr. 24, 2001
Appl. No.: 09/313,139
Filed: May 17, 1999

Reexamination Certificate C1 6,222,447 issued Mar. 15, 2011

Certificate of Correction issued Apr. 8, 2014

( * ) Notice: This patent is subject to a terminal disclaimer.

Related U.S. Application Data

(63) Continuation of application No. 08/935,336, filed on Sep. 22, 1997, now Pat. No. 5,949,331, which is a continuation of application No. 08/445,527, filed on May 22, 1995, now Pat. No. 5,670,935, which is a continuation-in-part of application No. 08/023,918, filed on Feb. 26, 1993, now Pat. No. 5,550,677.

(51) Int. Cl.
*B60Q 1/00* (2006.01)
*H04N 7/18* (2006.01)

(52) U.S. Cl.
CPC ........................................ *H04N 7/18* (2013.01)

(58) Field of Classification Search
None
See application file for complete search history.

(56) References Cited

To view the complete listing of prior art documents cited during the proceeding for Reexamination Control Number 90/011,478, please refer to the USPTO's public Patent Application Information Retrieval (PAIR) system under the Display References tab.

*Primary Examiner* — Majid A Banankhah

(57) ABSTRACT

A rearview vision system for a vehicle includes an image capture device mounted at the rear of the vehicle and having a field of view directed rearwardly of the vehicle. A display system is viewable by a driver of the vehicle. The display system displays a rearward image output of the image capture device. A graphic overlay is superimposed on the rearward image when the gear actuator of the vehicle selects a reverse gear. The graphic overlay may include indicia of the anticipated path of travel of the vehicle. The graphic overlay may be disabled when the gear actuator of the vehicle is not in reverse gear.

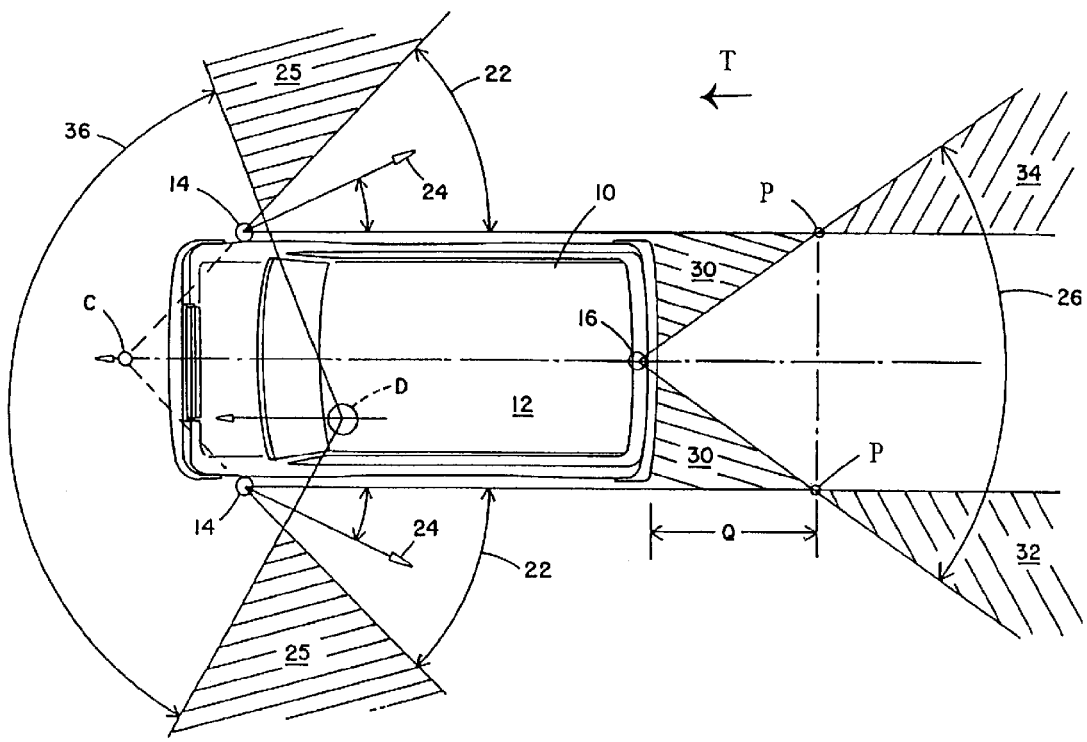

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-3 and 5-31 were previously cancelled.

Claims 4, 32-37, 40-56, 59-79, 82-99 and 102-172 are cancelled.

Claims 38-39, 57-58, 80-81 and 100-101 were not reexamined.

\* \* \* \* \*